United States Patent
Nakayasu et al.

(10) Patent No.: US 10,118,988 B2
(45) Date of Patent: Nov. 6, 2018

(54) SYNTHETIC RESIN LAMINATED SHEET

(71) Applicants: MITSUBISHI GAS CHEMICAL COMPANY, INC., Tokyo (JP); MGC FILSHEET CO., LTD., Saitama (JP)

(72) Inventors: Yasuyoshi Nakayasu, Tokyo (JP); Ken Ogasawara, Tokyo (JP); Genki Sugiyama, Ibaraki (JP); Hidetaka Shimizu, Ibaraki (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/518,321

(22) PCT Filed: Oct. 13, 2015

(86) PCT No.: PCT/JP2015/078873
§ 371 (c)(1),
(2) Date: Apr. 11, 2017

(87) PCT Pub. No.: WO2016/060100
PCT Pub. Date: Apr. 21, 2016

(65) Prior Publication Data
US 2017/0306089 A1  Oct. 26, 2017

(30) Foreign Application Priority Data

Oct. 15, 2014 (JP) .................. 2014-211201

(51) Int. Cl.
*C08G 64/14* (2006.01)
*B32B 27/30* (2006.01)
*B32B 27/36* (2006.01)
*B29C 51/00* (2006.01)
*B29C 45/14* (2006.01)
*C08G 64/04* (2006.01)
*C08G 64/08* (2006.01)

(52) U.S. Cl.
CPC ............. *C08G 64/14* (2013.01); *B29C 45/14* (2013.01); *B29C 51/00* (2013.01); *B32B 27/30* (2013.01); *B32B 27/36* (2013.01); *B32B 27/365* (2013.01); *C08G 64/04* (2013.01); *C08G 64/081* (2013.01)

(58) Field of Classification Search
USPC ............................................... 428/411.1, 412
See application file for complete search history.

(56) References Cited

U.S. PATENT DOCUMENTS

2004/0081821 A1  4/2004  Yokoo et al.
2009/0304977 A1  12/2009  Kanagawa et al.

FOREIGN PATENT DOCUMENTS

| EP | 2 108 680 A1 | 10/2009 |
|---|---|---|
| JP | 60203632 | 10/1985 |
| JP | 2002-060527 | 2/2002 |
| JP | 2004-143365 | 5/2004 |
| JP | 2006-103169 | 4/2006 |
| JP | 4971218 | 7/2012 |
| JP | 2014-043000 | 3/2014 |
| WO | 2007/132874 | 11/2007 |

OTHER PUBLICATIONS

International Search Report issued in Patent Application No. PCT/JP2015/078873, dated Jan. 19, 2016.
European Search Report issued with respect to Application No. 15850495.1, dated Mar. 6, 2018.
Database WPI Week 199444 Thomson Scientific, London, GB AN 1994-354908 XP002778138.

*Primary Examiner* — Terressa Boykin
(74) *Attorney, Agent, or Firm* — Greenblum & Bernstein, P.L.C.

(57) ABSTRACT

A synthetic resin laminated sheet, in which whitening, cracking, and foaming do not occur when thermoforming is carried out, in particular when deep-draw molding is carried out, and defects do not occur during lamination of a hard coating layer; and a molded article obtained by molding the laminated sheet. A synthetic resin laminated sheet has a coating layer, which includes an acrylic resin, laminated on one surface of a substrate layer including a polycarbonate resin in which a monohydric phenol represented by general formula (1) is used as a chain terminator and is obtained by reacting the monohydric phenol with a dihydric phenol and a carbonate binding agent and has a viscosity average molecular weight of 18000-35000. (In the formula, R1 represents a C8-36 alkyl group or a C8-36 alkenyl group. R2-R5 each represent hydrogen, halogen, or an optionally substituted C1-20 alkyl group or C6-12 aryl group).

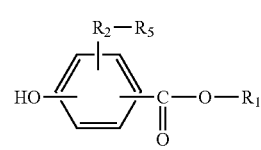

(1)

11 Claims, No Drawings

SYNTHETIC RESIN LAMINATED SHEET

TECHNICAL FIELD

The present invention relates to a laminated synthetic resin sheet that uses a polycarbonate resin having a specific terminal group and that is favorable to be used for thermoforming such as vacuum molding or pressure forming, and to a molded article obtained by molding this laminated synthetic resin sheet.

BACKGROUND ART

Since a polycarbonate resin is not only excellent in transparency but also excellent in workability and impact resistance as compared to glass and has no risk of toxic gas unlike other plastic materials, it is widely used in various fields and also as a material for thermoforming such as vacuum molding or pressure forming.

A polycarbonate resin, however, generally has low surface hardness and thus has a problem that the surface of a molded product made from the polycarbonate resin is susceptible to damage. Therefore, it has conventionally been proposed to form a protection layer made from an acrylic resin on the surface of a polycarbonate resin layer so as to prevent the surface of the product from being damaged.

For example, Patent Document 1 proposes a laminated body having a total thickness of 0.5-1.2 mm, which is obtained by laminating an acrylic resin layer with a thickness of 50-120 μm on one surface of a polycarbonate resin layer by coextrusion.

Moreover, Patent Document 2 discloses a scratch resistant acrylic film favorable as a display window protection plate for a portable information terminal device, which is obtained by providing a hard coat onto an acrylic film including an acrylic resin layer made from a rubber-particle-dispersed methacrylic resin to impart scratch resistance.

Furthermore, Patent Document 3 discloses a thermoformed article obtained by thermoforming a resin sheet for molding, where the absolute value of the difference in the glass-transition temperature between a polycarbonate-based resin made from a polymer alloy of an aromatic polycarbonate resin and other resin, and an acrylic resin is within 30° C.

Patent Document 1: Japanese Unexamined Patent Application Publication No. 2006-103169
Patent Document 2: Japanese Unexamined Patent Application Publication No. 2004-143365
Patent Document 3: Japanese Patent No. 4971218

SUMMARY OF INVENTION

Problems to be Solved by Invention

As described above, in a case of a laminated body having a protection layer made from an acrylic resin formed on a surface of a polycarbonate resin layer, the sheet needs to be heated to a temperature where the polycarbonate resin is sufficiently elongated upon thermoforming, especially upon deep-draw molding. Since excessive heat is given to the acrylic resin, peeling may occur at an interface between the polycarbonate-based resin layer and the acrylic resin layer, causing whitening or crack of the surface. In addition, if the above-described laminated body is not dried enough before the thermoforming, bubbles may be made. In a case where a polycarbonate-based resin made from a polymer alloy is used, lamination failure often occurs at the interface between the resins (turbulence at the interface) upon coextrusion with an acrylic resin. Moreover, a polycarbonate-based resin obtained from a polymer alloy is likely to be decomposed by heat and is confirmed to frequently cause black spots, bumps or the like. Defects such as whitening of the interface or cracks in the HC are also similarly caused upon thermoforming a sheet laminated with a hard coat layer (hereinafter, referred to as HC or HC layer).

Accordingly, the present invention aims at providing a novel laminated synthetic resin sheet having an acrylic resin layer laminated on a surface of a polycarbonate resin layer, in which whitening, crack or bubble making is not caused even when the laminated synthetic resin sheet is subjected to thermoforming, especially deep-draw molding and also no defect is caused upon HC lamination, and aims at providing a molded article by molding the same. Moreover, lamination failure upon coextrusion can be prevented by using, as a substrate layer, a polycarbonate resin substantially alone instead of a polycarbonate-based resin that is obtained as a polymer alloy containing other component. Furthermore, occurrence of black spots and bumps can be suppressed by using a highly heat resistant polycarbonate resin.

Solution to Problem

The present inventors have gone through keen investigation for solving each of the above-described problems, and eventually accomplished the present invention. Specifically, the present invention is as follows.

(I) A laminated synthetic resin sheet comprising a coating layer containing an acrylic resin (B) on at least one surface of a substrate layer containing a polycarbonate resin (A) with a viscosity-average molecular weight of 18,000-35,000 that is obtained by reacting a dihydric phenol and a carbonate binder using a monohydric phenol represented by General formula (1) below as a terminating agent:

[Chemical Formula 1]

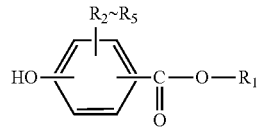

(1)

(wherein, $R_1$ represents an alkyl group with a carbon number of 8-36, or an alkenyl group with a carbon number of 8-36, $R_2$-$R_5$ each represent hydrogen, halogen or an optionally substituted alkyl group with a carbon number of 1-20 or aryl group with a carbon number of 6-12, and the substituent is halogen, an alkyl group with a carbon number of 1-20 or an aryl group with a carbon number of 6-12).

(II) The laminated synthetic resin sheet according to (1) above, wherein the dihydric phenol is expressed by General formula (3) below:

[Chemical Formula 2]

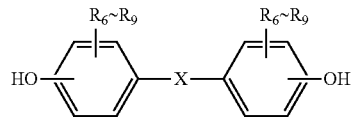

(3)

(wherein, $R_6$-$R_9$ each independently represent hydrogen, halogen, an optionally substituted alkyl group with a carbon number of 1-20, an optionally substituted alkoxy group with a carbon number of 1-5, an optionally substituted aryl group with a carbon number of 6-12, an optionally substituted aralkyl group with a carbon number of 7-17 or an optionally substituted alkenyl group with a carbon number of 2-15, the substituent is halogen, an alkyl group with a carbon number of 1-20 or an aryl group with a carbon number of 6-12, and X represents —O—, —S—, —SO—, —SO$_2$—, —CO— or any of the binding groups represented by Formulae (4) to (7) below)

[Chemical Formula 3]

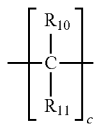
(4)

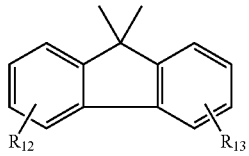
(5)

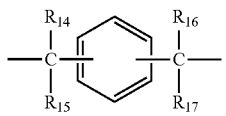
(6)

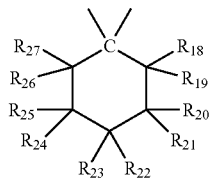
(7)

(wherein, $R_{10}$ and $R_{11}$ each represent hydrogen, halogen, an optionally substituted alkyl group with a carbon number of 1-20, an optionally substituted alkoxy group with a carbon number of 1-5, an optionally substituted aryl group with a carbon number of 6-12, an optionally substituted alkenyl group with a carbon number of 2-5 or an optionally substituted aralkyl group with a carbon number of 7-17, $R_{10}$ and $R_{11}$ may bind to each other to form a carbocyclic ring or a heterocyclic ring with a carbon number of 1-20, c represents an integer of 0-20, $R_{12}$ and $R_{13}$ each represent hydrogen, halogen, an optionally substituted alkyl group with a carbon number of 1-20, an optionally substituted alkoxy group with a carbon number of 1-5, an optionally substituted aryl group with a carbon number of 6-12, an optionally substituted alkenyl group with a carbon number of 2-5 or an optionally substituted aralkyl group with a carbon number of 7-17, $R_{12}$ and $R_{13}$ may bind to each other to form a carbocyclic ring or a heterocyclic ring with a carbon number of 1-20, $R_{14}$-$R_{17}$ each represent hydrogen, halogen, an optionally substituted alkyl group with a carbon number of 1-20, an optionally substituted alkoxy group with a carbon number of 1-5, an optionally substituted aryl group with a carbon number of 6-12, an optionally substituted alkenyl group with a carbon number of 2-5 or an optionally substituted aralkyl group with a carbon number of 7-17, $R_{14}$ and $R_{15}$, and $R_{16}$ and $R_{17}$ may respectively bind to each other to form a carbocyclic ring or a heterocyclic ring with a carbon number of 1-20, the substituent in Formulae (2) to (6) above is halogen, an alkyl group with a carbon number of 1-20 or an aryl group with a carbon number of 6-12, and $R_{18}$-$R_{27}$ each represent a hydrogen atom or an alkyl group with a carbon number of 1-3.

(III) A laminated synthetic resin sheet according to either one of (I) and (II) above, wherein the monohydric phenol represented by Formula (1) above is at least one selected from the group consisting of 2-hexyldecyl para-hydroxybenzoate, hexadecyl para-hydroxybenzoate, dodecyl para-hydroxybenzoate and 2-ethylhexyl para-hydroxybenzoate.

(IV) The laminated synthetic resin sheet according to any one of (I) to (III) above, wherein an elongational viscosity of the polycarbonate resin (A) shows a strain softening property at a strain rate of 0.01-5.0/sec.

(V) The laminated synthetic resin sheet according to any one of (I) to (IV) above, wherein an absolute value of the difference in the glass-transition temperature between the polycarbonate resin (A) and the acrylic resin (B) is within 30° C.

(VI) The laminated synthetic resin sheet according to any one of (I) to (V) above, wherein a hard coat layer is laminated on a surface of the acrylic resin (B) layer opposite to the polycarbonate resin (A) layer.

(VII) The laminated synthetic resin sheet according to (VI) above, wherein the thickness of the hard coat layer is 1-20 μm.

(VIII) A thermoformed article obtained by thermoforming the laminated synthetic resin sheet according to any one of (I) to (VII) above to have a deep-drawn height of 5 mm or more.

(IX) The thermoformed article according to (VIII) above, wherein the radius R of a part thermoformed into a right-angled shape is within 3.0 mm.

(X) An in-mold molded article obtained by forming a print layer on the substrate layer side of the laminated synthetic resin sheet according to any one of (I) to (VII) above upon thermoforming, and further injection molding a molten resin on the print layer side to form a backing layer.

(XI) A laminated synthetic resin sheet comprising a coating layer containing an acrylic resin (B) laminated on at least one surface of a substrate layer containing a polycarbonate resin (A) with a viscosity-average molecular weight of 18,000-35,000 and having a terminal group represented by General formula (1-a) below resulting from a monohydric phenol terminating agent:

[Chemical Formula 4]

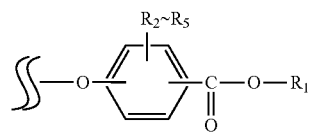
(1-a)

(wherein, $R_1$ represents an alkyl group with a carbon number of 8-36 or an alkenyl group with a carbon number of 8-36, $R_2$-$R_5$ each represent hydrogen, halogen or an optionally substituted alkyl group with a carbon number of 1-20 or an aryl group with a carbon number of 6-12, and the substituent is halogen, an alkyl group with a carbon number of 1-20 or an aryl group with a carbon number of 6-12).

Since a laminated synthetic resin sheet of the present invention is provided with a coating layer that contains an acrylic resin (B) as a main component, the surface of the coating layer of the laminated synthetic resin sheet as well as the surface of the product obtained by molding said laminated synthetic resin sheet are less susceptible to damage.

With respect to a polycarbonate resin (A) of a substrate layer, an elongational viscosity shows a strain softening property at a strain rate of 0.01-5.0/sec as will be described in detail below. Since the polycarbonate resin elongates very easily upon thermoforming, especially upon deep-draw molding, whitening or crack can be suppressed. Moreover, the polycarbonate resin (A) has a long-chain terminal group, it can easily be softened at a high temperature and has lower Tg as compared to conventional polycarbonates. For example, since the difference (absolute value) in the glass-transition temperature from the acrylic resin (B), i.e., the main component of the coating layer, can be made to lie within 30° C., excessive heating of the acrylic resin (B) upon molding can be prevented and thus bubbles made upon thermoforming can be prevented. Even in a structure where a hard coat layer is provided on the coating layer, the laminated body can easily be elongated due to the strain softening property of the polycarbonate resin substrate layer, and crack of the hard coat layer caused by heating and deformation can be prevented by making the difference in the glass-transition temperature to lie within 30° C.

Hence, a molded article excellent in design property, for example, an in-mold molded article excellent in design property can be provided by using the laminated synthetic resin sheet of the present invention for thermoforming.

DESCRIPTION OF EMBODIMENTS

Hereinafter, an exemplary embodiment of the present invention will be described, although the present invention should not be limited to the embodiment described below.

A laminated synthetic resin sheet according to this embodiment (hereinafter, referred to as a "laminated synthetic resin sheet of interest") is a laminated sheet in which a coating layer that contains an acrylic resin (B) as a main component is provided on at least one surface of a polycarbonate resin (A) substrate layer with a viscosity-average molecular weight of 18,000-35,000 that is obtained through a reaction using a monohydric phenol represented by General formula (1) below as a terminating agent. Preferably, an elongational viscosity of the polycarbonate resin (A) shows a strain softening property at a strain rate of 0.01-5.0/sec. Furthermore, in a more preferable laminated synthetic resin sheet, the absolute value of the difference in the glass-transition temperature between the polycarbonate resin (A) and the acrylic resin (B) is within 30° C., that is, 0° C.-30° C., preferably 0-20° C. and particularly preferably 0-10° C.

[Chemical Formula 5]

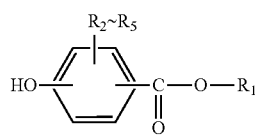

(1)

(wherein $R_1$ represents an alkyl group with a carbon number of 8-36 or an alkenyl group with a carbon number of 8-36, and $R_2$-$R_5$ each represent hydrogen, halogen, an optionally substituted alkyl group with a carbon number of 1-20 or an optionally substituted aryl group with a carbon number of 6-12, and the substituent is halogen, an alkyl group with a carbon number of 1-20 or an aryl group with a carbon number of 6-12).

<Substrate Layer>

The substrate layer of the laminated synthetic resin sheet of interest contains, as a main component, a polycarbonate resin that can be obtained by reacting a dihydric phenol represented by General formula (3), a carbonate binder and the terminating agent represented by General formula (1) above.

[Chemical Formula 6]

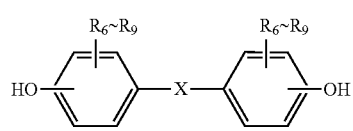

(3)

(wherein, $R_6$-$R_9$ each independently represent hydrogen, halogen, an optionally substituted alkyl group with a carbon number of 1-20, preferably a carbon number of 1-9, an optionally substituted alkoxy group with a carbon number of 1-5, preferably a carbon number of 1-3, an optionally substituted aryl group with a carbon number of 6-12, preferably a carbon number of 6-8, an optionally substituted aralkyl group with a carbon number of 7-17, preferably a carbon number of 7-12 or an optionally substituted alkenyl group with a carbon number of 2-15, preferably a carbon number of 2-5, where each of the above-mentioned substituents is halogen, an alkyl group with a carbon number of 1-20 or an aryl group with a carbon number of 6-12, and X is —O—, —S—, —SO—, —SO$_2$—, —CO— or any of the binding groups represented by Formulae (4) to (7) below).

[Chemical Formula 7]

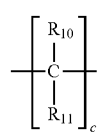

(4)

(5)

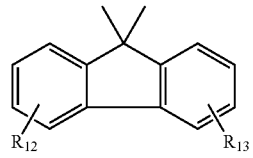

(6)

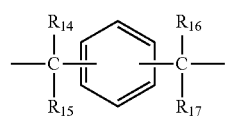

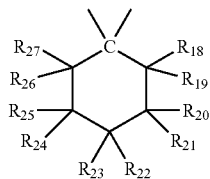
(7)

(In Formula (4), $R_{10}$ and $R_{11}$ each represent hydrogen, halogen, an optionally substituted alkyl group with a carbon number of 1-20, preferably a carbon number of 1-9, an optionally substituted alkoxy group with a carbon number of 1-5, preferably a carbon number of 1-3, an optionally substituted aryl group with a carbon number of 6-12, preferably a carbon number of 6-8, an optionally substituted alkenyl group with a carbon number of 2-15, preferably a carbon number of 2-5 or an optionally substituted aralkyl group with a carbon number of 7-17, preferably a carbon number of 7-12. In addition, $R_{10}$ and $R_{11}$ may bind to each other to form a carbocyclic ring or a heterocyclic ring with a carbon number of 1-20, preferably a carbon number of 1-12, and c represents an integer of 0-20, preferably an integer of 1-12).

(In Formula (5), $R_{12}$ and $R_{13}$ each represent hydrogen, halogen, an optionally substituted alkyl group with a carbon number of 1-20, preferably a carbon number of 1-9, an optionally substituted alkoxy group with a carbon number of 1-5, preferably a carbon number of 1-3, an optionally substituted aryl group with a carbon number of 6-12, preferably a carbon number of 6-8, an optionally substituted alkenyl group with a carbon number of 2-15, preferably a carbon number of 2-5 or an optionally substituted aralkyl group with a carbon number of 7-17, preferably a carbon number of 7-12. In addition, $R_1$, and $R_{13}$ may bind to each other to form a carbocyclic ring or a heterocyclic ring with a carbon number of 1-20, preferably a carbon number of 1-12).

(In Formula (6), $R_{14}$-$R_{17}$ each represent hydrogen, halogen, an optionally substituted alkyl group with a carbon number of 1-20, preferably a carbon number of 1-9, an optionally substituted alkoxy group with a carbon number of 1-5, preferably a carbon number of 1-3, an optionally substituted aryl group with a carbon number of 6-12, preferably a carbon number of 6-8, an optionally substituted alkenyl group with a carbon number of 2-15, preferably a carbon number of 2-5 or an optionally substituted aralkyl group with a carbon number of 7-17, preferably a carbon number of 7-12. In addition, $R_{14}$ and $R_{15}$, and $R_{16}$ and $R_{17}$ may respectively bind to each other to form a carbocyclic ring or a heterocyclic ring with a carbon number of 1-20).

(The substituent in Formulae (3) to (6) above is halogen, an alkyl group with a carbon number of 1-20 or an aryl group with a carbon number of 6-12).

(In Formula (7), $R_{18}$-$R_{27}$ each represent a hydrogen atom or an alkyl group with a carbon number of 1-3).

Examples of the dihydric phenol in General formula (3) above include 2,2-bis(4-hydroxyphenyl)propane [=bisphenol A], bis(4-hydroxyphenyl)-p-diisopropylbenezene, 4,4'-dihydroxydiphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3,5-diphenylphenyl)propane, 2,2-bis(4-hydroxy-3,5-dibromophenyl)propane, 2,2-bis(4-hydroxyphenyl)pentane, 2,4'-dihydroxy-diphenylmethane, bis-(4-hydroxyphenyl)methane, bis-(4-hydroxy-3-nitrophenyl)methane, 1,1-bis(4-hydroxyphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dimethyldiphenyl ether, 4,4'-dihydroxy-2,5-diethoxydiphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, 9,9-bis(4-hydroxyphenyl)fluorene, 9,9-bis(4-hydroxy-3-methylphenyl)fluorene, and 2,2-bis(4-hydroxyphenyl)hexafluoropropane, where it is preferably a bis(4-hydroxyphenyl)alkane, and particularly preferably 2,2-bis(4-hydroxyphenyl)propane [bisphenol A]. These aromatic dihydroxy compounds may be used alone or two or more of them may be used as a mixture. In addition, a compound having one or more tetraalkylphosphonium sulfonate bound to the above-mentioned aromatic dihydroxy compound, or a polymer or an oligomer having a siloxane structure and containing phenolic OH groups at both terminals may be used in combination as a part of a dihydroxy compound.

In order to obtain a branched aromatic polycarbonate resin as a polycarbonate resin used for forming a substrate layer, a polyhydroxy compound such as phloroglucin, 4,6-dimethyl-2,4,6-tris(4-hydroxyphenyl)heptene-2, 4,6-dimethyl-2,4,6-tris(4-hydroxyphenyl)heptane, 2,6-dimethyl-2,4,6-tris(4-hydroxyphenyl)heptene-3,1,3,5-tris(4-hydroxyphenyl)benzene or 1,1,1-tris(4-hydroxyphenyl)ethane, or 3,3-bis(4-hydroxyaryl)oxyindole (=isatin bisphenol), 5-chloroisatin bisphenol, 5,7-dichloroisatin bisphenol, 5-bromoisatin bisphenol or the like can be used as a part of the above-mentioned aromatic dihydroxy compound. An amount of the above-described compound used in the total dihydric phenol is 0.01-10 mol %, and preferably 0.1-3 mol %.

Carbonate Binder

Examples of the carbonate binder of the present invention include phosgene, triphosgene, carbonate diester and carbonyl-based compounds such as carbon monoxide and carbon dioxide.

Examples of carbonate diester include dialkyl carbonate compounds such as dimethyl carbonate, diethyl carbonate and di-tert-butyl carbonate, and substituted diphenyl carbonates such as diphenyl carbonate, di-p-tolyl carbonate, phenyl-p-tolyl carbonate and di-p-chlorophenyl carbonate. Among them, diphenyl carbonate and substituted diphenyl carbonate are preferable, and diphenyl carbonate is particularly preferable. These carbonate diester compounds may be used alone or two or more of them may be used as a mixture.

Terminating Agent

The terminating agent of the present invention is represented by General formula (1).

[Chemical Formula 8]

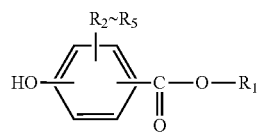
(1)

(wherein, $R_1$ represents an alkyl group with a carbon number of 8-36 or an alkenyl group with a carbon number of 8-36, $R_2$-$R_5$ each represent hydrogen, halogen, an optionally substituted alkyl group with a carbon number of 1-20 or an optionally substituted aryl group with a carbon number of 6-12, $R_2$-$R_5$ preferably represent hydrogen, halogen, an optionally substituted alkyl group with a carbon number of 1-9 or an optionally substituted aryl group with a carbon number of 6-8).

By using the terminating agent of Formula (1) above, the polycarbonate resin will have a terminal group represented by General formula (1-a) below.

[Chemical Formula 9]

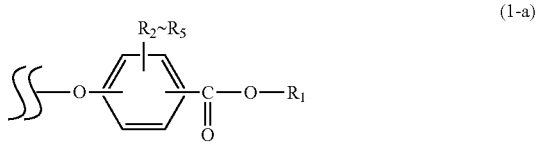

(1-a)

(wherein, $R_1$ represents an alkyl group with a carbon number of 8-36 or an alkenyl group with a carbon number of 8-36, and $R_2$-$R_5$ each represent hydrogen, halogen or an optionally substituted alkyl group with a carbon number of 1-20 or aryl group with a carbon number of 6-12, where the substituent is halogen, an alkyl group with a carbon number of 1-20 or an aryl group with a carbon number of 6-12).

More preferably, the monohydric phenol of General formula (1) is represented by General formula (2).

[Chemical Formula 10]

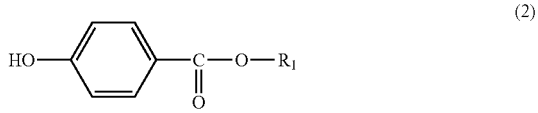

(2)

(wherein, $R_1$ represents an alkyl group with a carbon number of 8-36 or an alkenyl group with a carbon number of 8-36).

More preferably, the carbon number of $R_1$ in General formula (1) or (2) is within a specific numerical range.

Specifically, the upper limit of the carbon number of $R_1$ is preferably 36, more preferably 22 and particularly preferably 18. Meanwhile, the lower limit of the carbon number of $R_1$ is preferably 8 and more preferably 12.

Among the monohydric phenols (terminating agents) represented by General formula (1) or (2), either or both of hexadecyl para-hydroxybenzoate and 2-hexyldecyl para-hydroxybenzoate are particularly preferably used as the terminating agent.

For example, when a monohydric phenol (terminating agent) where $R_1$ is an alkyl group with a carbon number of 16 is used, glass-transition temperature, melt fluidity, moldability, drawdown resistance and solubility of the monohydric phenol in a solvent are excellent upon producing a polycarbonate resin, and thus it is particularly preferable as a terminating agent used for the polycarbonate resin of the present invention.

On the other hand, if the carbon number of $R_1$ in General formula (1) or (2) is too large, the solubility of the monohydric phenol (terminating agent) in an organic solvent is likely to be deteriorated, which may reduce the productivity upon producing a polycarbonate resin.

For example, if the carbon number of $R_1$ is 36 or less, high productivity and good economical efficiency can be realized upon producing a polycarbonate resin. If the carbon number of $R_1$ is 22 or less, the monohydric phenol would have particularly excellent solubility in an organic solvent and thus the productivity can be very high and the economical efficiency can be enhanced upon producing a polycarbonate resin.

If the carbon number of $R_1$ in General formula (1) or (2) is too small, the glass-transition temperature of the polycarbonate resin would not be low enough and the thermoformability may be deteriorated.

Without departing from the intent of the present invention, the main backbone or the terminating agent can be used in combination with those having other structures, mixed with other polycarbonate resin or additionally mixed with other transparent resin, according to characteristics required for the material. Preferably, 80 mol % or more of the total terminating agent used has the structure represented by Formula (1) above. More preferably, 90 mol % or more of the total terminating agent used has the structure represented by Formula (1) above. Particularly preferably, the total terminating agent has the structure represented by Formula (1) above.

Examples of other terminating agent that can be used in combination include phenol, p-cresol, o-cresol, 2,4-xylenol, p-t-butylphenol, o-allylphenol, p-allylphenol, p-hydroxystyrene, p-hydroxy-α-methylstyrene, p-propylphenol, p-cumylphenol, p-phenylphenol, o-phenylphenol, p-trifluoromethylphenol, p-nonylphenol, p-dodecylphenol, eugenol, alkylphenols such as amylphenol, hexylphenol, heptylphenol, octylphenol, nonylphenol, decylphenol, dodecylphenol, myristyl phenol, palmityl phenol, stearyl phenol and behenyl phenol, and esters of para-hydroxybenzoate alkyl such as methyl ester, ethyl ester, propyl ester, butyl ester, amyl ester, hexyl ester and heptyl ester of para-hydroxybenzoate. Moreover, two or more of the above-mentioned monohydric phenols may be used in combination.

Depending on the synthesis conditions, the terminal group formed may be a phenolic OH group itself that does not react with the terminating agent. Preferably, the number of the phenolic OH group is as small as possible. Specifically, 80 mol % or more of the entire terminal groups are preferably blocked with the structure represented by Formula (1) above, and 90 mol % or more of the entire terminal groups are particularly preferably blocked with the structure represented by Formula (1) above.

<Polymerization Degree and Amount of Monohydric Phenol (Terminating Agent) Used>

The molecular weight of the polycarbonate resin of the present invention is controlled by the amount of the monohydric phenol (terminating agent) used.

The polymerization degree of the dihydric phenol (represented by General formula (2)) used as the main backbone and the amount of the monohydric phenol (terminating agent) used are expressed in Formula (A).

[Numerical Formula 1]

[Amount of monohydric phenol (terminating agent) used (mol)]=[Amount of dihydric phenol used (mol)/Polymerization degree of main backbone]×2    (A)

While the amounts of the monohydric phenol and the dihydric phenol are determined based on this formula, the range of [amount of dihydric phenol used (mol): amount of monohydric phenol (terminating agent) used (mol)] is preferably 50:1-15:1 and more preferably 40:1-17:1.

In order to obtain a branched aromatic polycarbonate resin as a monohydric phenol (terminating agent), a polyhydroxy compound such as phloroglucin, 4,6-dimethyl-2,4,6-tris(4-hydroxyphenyl)heptene-2, 4,6-dimethyl-2,4,6-tris(4-hydroxyphenyl)heptane, 2,6-dimethyl-2,4,6-tris(4-hydroxyphenyl)heptene-3,1,3,5-tris(4-hydroxyphenyl) benzene or 1,1,1-tris(4-hydroxyphenyl)ethane, or 3,3-bis(4-hydroxyaryl)oxyindole (=isatin bisphenol), 5-chloroisatin bisphenol, 5,7-dichloroisatin bisphenol, 5-bromoisatin bisphenol or the like may be used as a part of the above-described monohydric phenol compound, in an amount of 0.01-10 mol %, preferably 0.1-3 mol %.

Additives

The polycarbonate resin used for the present invention may be blended with various additives without departing from the intent of the present invention. Examples of such additives include at least one additive selected from the group consisting of a thermal stabilizer, an antioxidant, a flame retardant, an auxiliary flame retardant, an ultraviolent absorbent, a mold release agent and a colorant.

In addition, an antistatic agent, a fluorescent brightening agent, an antifogging agent, a fluidity improving agent, a plasticizer, a dispersant, an antibacterial agent or the like may also be added as long as the various physical properties desired are not impaired.

Examples of the thermal stabilizer include phenol-based, phosphorus-based and sulfur-based thermal stabilizers. Specifically, oxoacids of phosphorus such as phosphoric acid, phosphonic acid, phosphorous acid, phosphinic acid and polyphosphoric acid; metal acid pyrophosphates such as sodium acid pyrophosphate, potassium acid pyrophosphate and calcium acid pyrophosphate; phosphoric salts of group 1 or 10 metals such as potassium phosphate, sodium phosphate, cesium phosphate and zinc phosphate; and organic phosphate compounds, organic phosphite compounds and organic phosphonite compounds. Alternative examples include at least one selected from the group consisting of (a) a phosphite compound where at least one ester of the molecule is esterified with a phenol and/or a phenol having at least one alkyl group with a carbon number of 1-25, (b) phosphorous acid and (c) tetrakis(2,4-di-tert-butylphenyl)-4,4'-biphenylene-di-phosphonite. Specific examples of (a) the phosphite compound include trioctyl phosphite, trioctadecyl phosphite, tridecyl phosphite, trilauryl phosphite, tristearyl phosphite, triphenyl phosphite, tris(mononnonylphenyl)phosphite, tris(mononnonyl/dinonyl phenyl) phosphite, tris nonylphenyl phosphite, tris(octylphenyl) phosphite, tris(2,4-di-tert-butylphenyl)phosphite, trinonyl phosphite, didecylmonophenyl phosphite, dioctylmonophenyl phosphite, diisopropyl monophenyl phosphite, monobutyl diphenyl phosphite, monodecyl diphenyl phosphite, bis(2,4-di-tert-butylphenyl)pentaerythritol phosphite, bis(2,6-di-tert-butyl-4-methylphenyl)pentaerythritol phosphite, monooctyl diphenyl phosphite, distearyl pentaerythritol diphosphite, tricyclohexyl phosphite, diphenylpentaerythritol diphosphite, bis(2,6-di-tert-butyl-4-methylphenyl)pentaerythritol diphosphite, 2,2-methylene bis(4,6-di-tert-butylphenyl)octyl phosphite, bis(nonylphenyl)pentaerythritol diphosphite, bis(2,4-di-tert-butylphenyl)pentaerythritol diphosphite and bis(2,6-di-tert-butyl-4-ethylphenyl)pentaerythritol diphosphite. These may be used alone or two or more of them may be used as a mixture.

Examples of the organic phosphite compound specifically include those under the trade names of "ADK STAB 1178", "ADK STAB 2112" and "ADK STAB HP-10" from Adeka Corporation, and "JP-351", "JP-360" and "JP-3CP" from Johoku Chemical and "IRGAFOS 168" from Ciba Specialty Chemicals.

Examples of the phosphate ester include trimethyl phosphate, triethyl phosphate, tributyl phosphate, trioctyl phosphate, triphenyl phosphate, tricresyl phosphate, tris(nonylphenyl)phosphate and 2-ethylphenyl diphenyl phosphate.

An added proportion of the thermal stabilizer, if any, is, for example, 0.001 parts or more by mass, preferably 0.01 parts or more by mass and more preferably 0.03 parts or more by mass while 1 part or less by mass, preferably 0.7 parts or less by mass and more preferably 0.5 parts or less by mass with respect to 100 parts by mass of the aromatic polycarbonate resin. If the amount of the thermal stabilizer is too small, the thermally stabilizing effect may be insufficient whereas if the amount of the thermal stabilizer is too large, the effect may reach its peak which is not economical.

Examples of the antioxidant include a phenol-based antioxidant, a hindered phenol-based antioxidant, a bisphenol-based antioxidant and a polyphenol-based antioxidant. Specific examples include 2,6-di-tert-butyl-4-methylphenol, tris(3,5-di-tert-butyl-4-hydroxybenzyl)isocyanurate, n-octadecyl-3-(3',5'-di-tert-butyl-4'-hydroxyphenyepropionate, tetrakis [methylene-3-(3,5-di-tert-butyl-4-hydroxyphenyl)propionate]methane, 4,4'-butylidene bis(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2, 4,8,10-tetraoxaspiro[5,5]undecan, pentaerythritol tetrakis [3-(3,5-di-tert-butyl-4-hydroxyphenyl)propionate], thiodiethylene bis[3-(3,5-di-tert-butyl-4-hydroxyphenyl)propionate], N,N-hexane-1,6-diyl bis[3-(3,5-di-tert-butyl-4-hydroxyphenyl propionamide), 2,4-dimethyl-6-(1-methylpentadecyl)phenol, diethyl [[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene bis(oxyethylene)bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6 (1H,3H,5H)-trione and 2,6-di-tert-butyl-4-(4,6-bis(octylthio)-1,3,5-triazine-2-ylamino)phenol. Examples of the phenol-based antioxidant specifically include those under the registered trademarks of "ILGANOX 1010" and "ILGANOX 1076" from Ciba Specialty Chemicals, and "ADK STAB AO-50" and "ADK STAB AO-60" from Adeka Corporation.

An added proportion of the antioxidant, if any, is, for example, 0.001 parts or more by mass and preferably 0.01 parts or more by mass while 1 part or less by mass and preferably 0.5 parts or less by mass with respect to 100 parts by mass of the aromatic polycarbonate resin. If the added proportion of the antioxidant is less than the lower limit, the effect as the antioxidant may be insufficient whereas if the added proportion of the antioxidant exceeds the upper limit, the effect may reach its peak which is not economical.

Examples of the flame retardant include organic metal sulfonates. Examples of the organic metal sulfonates include aliphatic metal sulfonates and aromatic metal sulfonates, which may be used alone or two or more of them may be used in combination. The metal salt is preferably an alkali metal salt or an alkaline earth metal salt. Examples of the alkali metal include sodium, lithium, potassium, rubidium and cesium. Examples of the alkaline earth metal include calcium and strontium. The metal of the organic metal sulfonate used with the present invention is preferably an alkali metal such as sodium, potassium, rubidium or cesium, and more preferably sodium or potassium. Use of such a metal has effects of effectively promoting the formation of a carbonized layer upon burning and maintaining high transparency.

Examples of the aliphatic sulfonate preferably include fluoroalkane-metal sulfonates, and more preferably include perfluoroalkane-metal sulfonates.

Furthermore, examples of the fluoroalkane-metal sulfonates include alkali metal salts and alkaline earth metal salts, where alkali metal salts are preferable. The carbon number of a fluoroalkane metal sulfonate is preferably 1-8, and more preferably 2-4. Within such a range, high transparency can be maintained. Specific examples of the preferable fluoroalkane-metal sulfonates include sodium perfluorobutane-sulfonate, potassium perfluorobutane-sulfonate, sodium perfluoroethane-sulfonate and potassium perfluoroethane-sulfonate.

Examples of the aromatic metal sulfonates include alkali metal salts and alkaline earth metal salts, where alkali metal salts are preferable. Specific examples of the alkali metal salts of aromatic sulfonates include sodium 3,4-dichlorobenzenesulfonate, sodium 2,4,5-trichlorobenzenesulfonate, sodium benzenesulfonate, sodium salt of diphenylsulfone-3-sulfonate, potassium salt of diphenylsulfone-3-sulfonate, sodium salt of 4,4'-dibromodiphenyl-sulfone-3-sulfonate, potassium salt of 4,4'-dibromophenyl-sulfone-3-sulfonate, disodium salt of diphenylsulfone-3,3'-disulfonate, dipotassium salt of diphenylsulfone-3,3'-disulfonate, sodium dodecylbenzenesulfonate, potassium dodecylbenzenesulfonate, potassium p-toluenesulfonate and potassium p-styrenesulfonate.

Especially from the viewpoint of enhancing transparency, the organic metal sulfonate used with the present invention is preferably potassium salt of diphenylsulfone-3-sulfonate, potassium p-toluenesulfonate, potassium p-styrenesulfonate or potassium dodecylbenzenesulfonate, and more preferably potassium diphenylsulfone-3-sulfonate. The mass of the organic metal sulfonate added is 0.005-0.1 parts by mass, preferably 0.01-0.1 parts by mass and more preferably 0.03-0.09 parts by mass with respect to 100 parts by mass of the aromatic polycarbonate resin.

According to the present invention, a flame retardant other than an organic metal sulfonate may be blended.

As the auxiliary flame retardant, for example, a silicone compound can be added. The silicone compound is preferably one that has a phenyl group in the molecule. By having a phenyl group, dispersibility of the silicone compound in the polycarbonate is enhanced, and the polycarbonate resin will be excellent in transparency and flame retardance. The mass-average molecular weight of the silicone compound is preferably 450-5,000, more preferably 750-4,000, still more preferably 1,000-3,000 and particularly preferably 1,500-2, 500. The mass-average molecular weight is 450 or more so that the production will be facilitated, application to industrial production will be facilitated, and the heat resistance of the silicone compound is less likely to be deteriorated. On the other hand, the mass-average molecular weight of the silicone compound is 5,000 or less so that dispersibility in the polycarbonate resin composition is less likely to be deteriorated, while deterioration of the flame retardance of the aromatic polycarbonate resin composition and deterioration of the mechanical property are effectively suppressed.

An added proportion of the auxiliary flame retardant, if any, is, for example, 0.1 parts or more by mass and preferably 0.2 parts or more by mass while 7.5 parts or less by mass and preferably 5 parts or less by mass with respect to 100 parts by mass of the aromatic polycarbonate resin. If the added proportion of the auxiliary flame retardant is less than the lower limit, the flame retardance may be insufficient. If the added proportion of the auxiliary flame retardant exceeds the upper limit, an appearance defect such as delamination may occur by which transparency is deteriorated while the flame retardance may reach its peak which is not economical.

Examples of the ultraviolent absorbent include inorganic ultraviolent absorbents such as cerium oxide and zinc oxide as well as organic ultraviolent absorbents such as a benzotriazole compound, a benzophenone compound, a salicylate compound, a cyanoacrylate compound, a triazine compound, an oxanilide compound, a malonic ester compound, a hindered amine compound and a phenyl salicylate-based compound. Among them, benzotriazole-based or benzophenone-based organic ultraviolent absorbents are preferable. In particular, specific examples of the benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl) benzotriazole, 2,2'-methylene bis[4-(1,1,3,3-tetramethylbutyl)-6-(2N-benzotriazole-2-yl)phenol], 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(octyloxy) phenol, 2,2'-(1,4-phenylene)bis[4H-3,1-benzoxazine-4-one], [(4-methoxyphenyl)-methylene]-propanedioic acid-dimethyl ester, 2-(2H-benzotriazole-2-yl)-p-cresol, 2-(2H-benzotriazole-2-yl)-4,6-bis(1-methyl-1-phenylmethyl) phenol, 2-[5-chloro(2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4-(1,1,3,3-tetrabutyl)phenol, 2,2'-methylene bis[6-(2H-benzotriazole-2-yl)-4-(1,1,3,3-tetrabutyl)phenol] and [methyl-3[3-tert-butyl-5-(2H-benzotriazole-2-yl)-4-hydroxyphenyl]propionate-polyethylene glycol] condensates. Two or more of them may be used in combination. Among those listed above, 2-(2'-hydroxy-5 '-tert-octylphenyl)benzotriazole and 2,2-methylene-bis[4-(1,1,3,3-tetramethylbutyl)-6-(2N-benzotriazole2-yl)phenol] are preferable. Moreover, specific examples of the benzophenone-based ultraviolet absorbent include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone and 2,2',4,4'-tetrahydroxy-benzophenone. Specific examples of the phenyl salicylate-based ultraviolet absorbent include phenylsalicylate and 4-tert-butyl-phenylsalicylate. Furthermore, specific examples of the triazine-based ultraviolet absorbent include 2-(4,6-diphenyl-1,3,5-triazine-2-yl)-5-[(hexyl)oxy]-phenol and 2[4,6-bis(2,4-dimethylphenyl)-1,3,5-triazine-2-yl]-5-(octyloxy)phenol. A specific example of the hindered amine-based ultraviolet absorbent includes bis(2,2,6,6-tetramethylpiperidine-4-yl)sebacate.

An added proportion of the ultraviolent absorbent, if any, is, for example, 0.01 parts or more by mass and preferably 0.1 parts or more by mass while 3 parts or less by mass and preferably 1 part or less by mass, with respect to 100 parts by mass of the aromatic polycarbonate resin. If the added proportion of the ultraviolent absorbent is less that the lower limit, the effect of improving weatherability may be insufficient, whereas if the added proportion of the ultraviolent absorbent exceeds the upper limit, mold deposit or the like may occur which causes mold contamination (cooling roll contamination).

Examples of the mold release agent include carboxylic ester, a polysiloxane compound and paraffin wax (polyolefin-based). Specific examples include at least one compound selected from the group consisting of aliphatic carboxylic acids, esters derived from aliphatic carboxylic acid and alcohol, aliphatic hydrocarbon compounds with a number-average molecular weight of 200-15,000 and polysiloxane-based silicone oil.

Examples of the aliphatic carboxylic acid include saturated or unsaturated, aliphatic monovalent, divalent or trivalent carboxylic acids. Herein, an aliphatic carboxylic acid also comprises an alicyclic carboxylic acid. Among them, the aliphatic carboxylic acid is preferably a monovalent or divalent carboxylic acid with a carbon number of 6-36, and more preferably a saturated aliphatic monovalent carboxylic acid with a carbon number of 6-36. Specific examples of the aliphatic carboxylic acid include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid and azelaic acid. Specific examples of the ester derived from aliphatic carboxylic acid and alcohol include beeswax (a mixture having myricyl palmitate as its main component), stearyl stearate, behenyl behenate, stearyl behenate, glycerine monopalmitate, glycerine monostearate, glycerine distearate, glycerine tristearate, pentaerythritol monopalmitate, pentaerythritol monostearate, pentaerythritol distearate, pentaerythritol tristearate and pentaerythritol tetrastearate. Examples of the aliphatic hydrocarbon with a number-average molecular weight of 200-15,000 include liquid paraffin, paraffin wax, microwax, polyethylene wax, Fischer-Tropsch wax, and α-olefin oligomers with a carbon number of 3-12. Herein, the aliphatic hydrocarbon also comprises an alicyclic hydrocarbon. These hydrocarbon compounds may partially be oxidized. Among them, a partial oxide of paraffin wax, polyethylene wax or polyethylene wax is preferable, and paraffin wax or polyethylene wax is more preferable. The number-average molecular weight is preferably 200-5,000. These aliphatic hydrocarbons may be a single substance or a mixture of substances varying in constituents and molecular weights as long as the main component lies within the above-described range. Examples of the polysiloxane-based silicone oil include dimethyl silicone oil, phenylmethyl silicone oil, diphenyl silicone oil and fluorinated alkyl silicone. Two or more of them may be used in combination.

An added proportion of the mold release agent, if any, is, for example, preferably 0.001 parts or more by mass and more preferably 0.01 parts or more by mass while 2 parts or less by mass and more preferably 1 part or less by mass, with respect to 100 parts by mass of the aromatic polycarbonate resin. If the added proportion of the mold release agent is less than the lower limit, the effect of the mold release property may be insufficient whereas if the added proportion of the mold release agent exceeds the upper limit, deterioration of hydrolysis resistance and mold contamination upon injection molding may be caused.

Examples of a dye/pigment as the colorant include inorganic pigments, organic pigments and organic dyes. Examples of the inorganic pigment include sulfide-based pigments such as carbon black, cadmium red and cadmium yellow; silicate-based pigments such as ultramarine; oxide-based pigments such as titanium oxide, zinc oxide, Bengal red, chromium oxide, iron black, titanium yellow, zinc-iron-based brown, titanium-cobalt-based green, cobalt green, cobalt blue, copper-chromium-based black and copper-iron-based black; chromic acid-based pigments such as chrome yellow and molybdate orange; and ferrocyanide-based pigments such as prussian blue. In addition, examples of an organic pigment and an organic dye as the colorant include phthalocyanine-based dyes/pigments such as copper phthalocyanine blue and copper phthalocyanine green; azo-based dyes/pigments such as nickel azo yellow; condensed polycyclic dyes/pigments such as thioindigo-based, perinone-based, perylene-based, quinacridone-based, dioxazine-based, isoindolinone-based and quinophthalone-based condensed polycyclic dyes/pigments; and quinoline-based, anthraquinone-based, heterocyclic ring-based and methyl-based dye/pigments. Among them, titanium oxide, carbon black, cyanine-based, quinoline-based, anthraquinone-based and phthalocyanine-based dyes/pigments and the like are preferable in terms of thermal stability. Only a single type of dye/pigment may be contained or two or more types of them may be contained in any combination at any ratio. Moreover, the dye/pigment may be used in a masterbatch with a polystyrene-based resin, a polycarbonate-based resin or an acrylic resin for the purposes of improving handleability upon extrusion and improving dispersibility in a resin composition.

An added proportion of the colorant, if any, is, for example, 1 part or less by mass, preferably 0.5 parts or less by mass and more preferably 0.1 parts or less by mass, with respect to 100 parts by mass of the aromatic polycarbonate resin. If the added proportion of the colorant is too large, the impact resistance may be insufficient.

<Production Method>

A method for producing a polycarbonate resin used with the present invention may be, for example, any synthetic method such as an interfacial polymerization method, a pyridine method or a transesterification method.

For a reaction in an interfacial polymerization method, the normal pH is maintained at 10 or higher in the presence of an organic solvent inactive to the reaction and an aqueous alkaline solution while an aromatic dihydroxy compound, a terminating agent and, if necessary, an antioxidant for preventing oxidization of the aromatic dihydroxy compound are used and reacted with phosgene. Thereafter, a polymerization catalyst such as tertiary amine or quaternary ammonium salt is added for interfacial polymerization, thereby obtaining an aromatic polycarbonate resin. The addition of the molecular weight modifier is not particularly limited as long as it is done between phosgenation and initiation of the polymerization reaction. The reaction temperature is 0-35° C. and the reaction time is several minutes to several hours.

Examples of the organic solvent inactive to the reaction include chlorinated hydrocarbons such as dichloromethane, 1,2-dichloroethane, chloroform, monochlorobenzene and dichlorobenzene, and aromatic hydrocarbons such as benzene, toluene and xylene. Besides the compounds mentioned above as the terminating agent, a compound having a monohydric phenolic hydroxyl group can be used in combination within a range that does not impair the effect of the present invention. Examples of the polymerization catalyst include tertiary amines such as trimethylamine, triethylamine, tributylamine, tripropyl amine, trihexylamine and pyridine; and quaternary ammonium salts such as trimethylbenzyl ammonium chloride, tetramethyl ammonium chloride and triethylbenzyl ammonium chloride.

A reaction in a transesterification method is a transesterification reaction between a carbonate diester and an aromatic dihydroxy compound. In general, the mixing ratio of the carbonate diester and the aromatic dihydroxy compound is adjusted or the degree of pressure reduction upon the reaction is adjusted to determine the molecular weight and the amount of the terminal hydroxyl group of the aromatic polycarbonate resin desired. The amount of the terminal hydroxyl group greatly influences the thermal stability, hydrolysis stability, color tone and the like of the aromatic polycarbonate resin, and is preferably 1,000 ppm or less and more preferably 700 ppm or less in order to impart practical physical properties. The carbonate diester is generally used in an equal molar amount or more, preferably 1.01-1.30 mol, with respect to 1 mol of the aromatic dihydroxy compound.

Examples of the carbonate diester include dialkyl carbonate compounds such as dimethyl carbonate, diethyl carbonate and di-tert-butyl carbonate, diphenyl carbonates and substituted diphenyl carbonates such as di-p-tolyl carbonate, phenyl-p-tolyl carbonate and di-p-chlorophenyl carbonate. Among them, diphenyl carbonates and substituted diphenyl carbonates are preferable and diphenyl carbonates are particularly preferable. These carbonate diester compounds may be used alone or two or more of them may be used as a mixture.

When an aromatic polycarbonate resin is synthesized by a transesterification method, a transesterification catalyst is usually used. While the transesterification catalyst is not particularly limited, an alkali metal compound and/or an alkaline earth metal compound is mainly used. A basic compound such as a basic boron compound, a basic phosphorus compound, a basic ammonium compound or an amine-based compound may auxiliarily be used in combination. For a transesterification reaction that uses such raw materials, for example, a mixture of a dihydric phenol, a monohydric phenol (terminating agent) and carbonate diester in a molten state is fed into a reactor and allowed to react at a temperature of 100-320° C., by which melt polycondensation reaction eventually takes place under a reduced pressure of $2.7 \times 10^2$ Pa (2 mmHg) or less while removing byproducts such as an aromatic hydroxy compound. While the melt polycondensation may be performed either in batch mode or continuously, it is preferably performed continuously in the case of an aromatic polycarbonate resin used with the present invention from the view point of stability and the like. In the transesterification method, a compound for neutralizing a catalyst such as a sulfur-containing acidic compound or a derivative therefrom is preferably used as a deactivator of the catalyst contained in the aromatic polycarbonate resin, where it is added in an amount of 0.5-10 equivalent, preferably 1-5 equivalent to the alkali metal of the catalyst, and 1-100 ppm, preferably 1-20 ppm with respect to the aromatic polycarbonate resin.

Polycarbonate resin flakes can be obtained, for example, by dropping a methylene chloride solution containing an aromatic polycarbonate resin obtained by an interfacial polymerization method into warm water maintained at 45° C., and removing the solvent by evaporation. Alternatively, polycarbonate resin flakes can be obtained by feeding a methylene chloride solution containing an aromatic polycarbonate resin obtained by an interfacial polymerization method into methanol, and filtrating and drying the precipitated polymer. Alternatively, polycarbonate resin flakes can be obtained by agitating a methylene chloride solution containing a polycarbonate resin obtained by an interfacial polymerization method in a kneader, pulverizing the resultant by agitation while maintaining the temperature at 40° C., and desolvating the resultant with hot water of 95° C. or higher.

If necessary, the aromatic polycarbonate resin can be isolated by a well known method and then polycarbonate resin pellets can be obtained, for example, by a well known strand-type cold cut method (a method in which once melted aromatic polycarbonate resin composition is molded into a strand, cooled and then cut into a predetermined shape for pelletization), hot-cut-in-air type hot cut method (a method in which an once melted aromatic polycarbonate resin composition is cut into pellets in air before they make contact with water) or hot-cut-in-water type hot cut method (a method in which an once melted aromatic polycarbonate resin composition is cut in water and cooled at the same time for pelletization). If necessary, the resulting polycarbonate resin pellets are preferably dried by a method such as drying using a hot air drying furnace, a vacuum drying furnace or a dehumidification drying furnace.

Physical Properties (I) Molecular Weight

The molecular weight of a polycarbonate resin used with the present invention is evaluated by the viscosity-average molecular weight (Mv) measured under the following measurement conditions.

<Conditions for Measuring Viscosity-Average Molecular Weight (Mv)>

Measurement instrument: Ubbelohde capillary viscometer

Solvent: dichloromethane

Resin solution concentration: 0.5 grams/deciliter

Measurement temperature: 25° C.

After the measurement under the above-listed conditions, an intrinsic viscosity [η] deciliter/grams is determined at a Huggins coefficient of 0.45 to calculate the viscosity-average molecular weight by the Formula (B) below.

$$\eta = 1.23 \times 10^{-4} \times M v^{0.82} \qquad \text{(B) [Numerical formula 2]}$$

A viscosity-average molecular weight of a polycarbonate resin as a substrate layer of a laminated synthetic resin sheet of the present invention is preferably 18,000-35,000, more preferably 20,500-30,000 and particularly preferably 22,000-28,000.

The glass-transition temperature, the melt fluidity and the drawdown resistance are physical properties that are affected by the molecular weight, and all of these properties will be favorable for producing a sheet, a film and a thermoformed article as long as the viscosity-average molecular weight is within the above-described range.

If the viscosity-average molecular weight is greater than 35,000, melt fluidity may be deteriorated. In addition, the glass-transition temperature of the polycarbonate resin may not be low enough and thus thermoformability may be deteriorated.

If the viscosity-average molecular weight is less than 18,000, the drawdown resistance may be reduced.

(II) Elongational Viscosity

An elongational viscosity of a polycarbonate resin as a substrate layer of a laminated synthetic resin sheet of the present invention is measured with a rheometer under the following conditions.

<Conditions for Measuring Elongational Viscosity>

Instrument: Ares from Rheometorics

Accessories: Extensional Viscosity Fixture from TA Instruments

Measurement temperature: Glass-transition temperature of polycarbonate resin (A)+30° C.

Strain rate: 0.01, 1.0, 5.0/sec

Preparation of test piece: Press molded into a sheet of 18 mm×10 mm with a thickness of 0.7 mm.

An elongational viscosity of a polycarbonate resin forming a substrate layer of a laminated synthetic resin sheet of the present invention preferably shows a strain softening property at a strain rate of 0.01-5.0/sec, from the view point of thermoforming. A strain softening property is defined as behavior where an elongational viscosity of the resin is decreased with time under a constant strain rate condition when plotted on a double logarithmic chart in which the horizontal axis represents time t (sec) and the vertical axis represents the elongational viscosity ηE (Pa·sec) of the resin, in other words, behavior where the curve of the multiple plots on the above-described double logarithmic chart descends toward the right.

In general, in a specific molding method such as blow molding, foam molding or vacuum molding, a material that shows a strain hardening property where the elongational viscosity rapidly increases with time is favorable from the view point of molding workability, and the strain hardening property allows deformation with uniform thickness upon molding. However, in a case where a laminated sheet of an acrylic resin and a thermoplastic resin or said sheet further laminated with a HC layer is deep drawn and thermoformed into a right-angled shape, the thermoplastic resin layer with a strain hardening property will cause whitening at the interface with the acrylic resin layer, and will cause crack in the surface of the acrylic resin and the HC layer due to its force to uniformly elongate, and it would be difficult to make the radius R of the right-angled shape part to be close to 0 mm. On the other hand, a thermoplastic resin having the above-described strain softening property can favorably be used because appearance defects such as whitening and crack do not occur and the radius R of the right-angled shape part is close to 0 mm.

One of the reasons why a polycarbonate resin used with the present invention has a strain softening property includes that it has a long-chain terminal group represented by General formula (1) above. A polycarbonate resin that has, for example, an alkyl group or an alkenyl group with a carbon number of 8 or more as a long-chain terminal group (see General formula (1) above) is more easily softened at a high temperature as compared to a conventional polycarbonate having a terminal group with a less carbon number. Therefore, there is no need to apply a great amount of heat to the polycarbonate resin upon molding and thus excessive heating of the acrylic resin to be laminated can be prevented. As a result, the above-described effects can be achieved.

(III) Glass-transition Temperature

A glass-transition temperature of a polycarbonate resin as a substrate layer of a laminated synthetic resin sheet of the present invention is measured using a differential scanning calorimeter under the following conditions.

<Conditions for Measuring Glass-Transition Temperature>

Measurement instrument: Differential scanning calorimeter (DSC)

Heating rate: 10° C./min

Gas flow environment: 20 ml/min of nitrogen

Sample pretreatment: Heat melt at 300° C.

A glass-transition temperature of a polycarbonate resin as a substrate layer of a laminated synthetic resin sheet used with the present invention is preferably in a range of 100° C.-135° C. from the view points of production and molding of a thermoformed article. With respect to the balance between the above-described production and molding of a thermoformed article and productivity of the polycarbonate resin, the glass-transition temperature of the polycarbonate resin of the present invention is more preferably in a range of 110° C.-130° C. and particularly preferably in a range of 115° C.-130° C.

If the glass-transition temperature (Tg) is less than 100° C., polycarbonate resin powder may aggregate during the granulation and drying steps upon producing a polycarbonate resin, by which productivity is deteriorated.

A higher glass-transition point gives a wider process margin for the polycarbonate resin production because of the above-described reason, and a high quality polycarbonate resin with a low residual solvent content can efficiently and stably be produced. Thus, the glass-transition point of the polycarbonate resin of the present invention is more preferably 105° C. or higher and particularly preferably 110° C. or higher.

If Tg exceeds 135° C., the resin needs to be melted at a high temperature upon producing a thermoformed article and also the resin needs to be softened or melted at a high temperature upon molding the thermoformed article into a specific shape. Accordingly, the energy consumption may increase or the hue of the resin may be deteriorated, which is unfavorable. In addition, if a hard coat layer is applied onto the surface of the laminated synthetic resin sheet of the present invention, crack is likely to occur in the hard coat layer upon softening at a high temperature due to the difference in the glass-transition temperature from the acrylic resin (B), which is unfavorable.

A melt fluidity of a polycarbonate resin as a substrate layer of a laminated synthetic resin sheet of the present invention is evaluated by a Q value determined with a Koka type flow tester under the following conditions. High Q value represents high melt fluidity whereas low Q value represents low melt fluidity.

(IV) Q Value

<Conditions for Measuring Q Value>

Measurement instrument: Flow tester, flow characteristics evaluation device

Load: 160 kgf/cm$^2$

Orifice: Diameter 1 mm×length 10 mm

Measurement temperature: 280° C.

If the Q value of the polycarbonate resin determined under the above-described measurement conditions is less than $1\times10^{-2}$ cc/s, a thermoformed article needs to be produced and molded at a temperature that is higher than usual even if the glass-transition temperature is low since the melt fluidity is too low, which may cause decomposition of the polycarbonate resin or hue deterioration.

On the other hand, if the Q value of the polycarbonate resin determined under the above-described measurement conditions is $30\times10^{-2}$ cc/s or higher, the drawdown resistance would be poor since the melt fluidity is too high and significant drawdown will occur upon molding a thermoformed article, resulting in a molding defect. Because of the above-described reasons, a Q value of a polycarbonate resin of the present invention is preferably in a range of $1\times10^{-2}$ cc/s to $30\times10^{-2}$ cc/s, and particularly preferably in a range of $2\times10^{-2}$ cc/s to $30\times10^{-2}$ cc/s.

(V) Thermal Loss

A thermal decomposition property of a polycarbonate resin as a substrate layer of a laminated synthetic resin sheet of the present invention is evaluated by a thermal loss temperature. The thermal loss temperature is measured with a thermogravimetric analyzer (TGA) at a heating, rate of 20° C./min in an air flow environment of 50 ml/min.

In order to evaluate the thermal decomposition property of a thermoformed article containing a polycarbonate resin as a substrate layer of a laminated synthetic resin sheet of the present invention upon production and molding. 0.2% thermal loss temperature is preferably used as an index. The 0.2% thermal loss temperature of the polycarbonate resin of the present invention is preferably 260° C. or higher, more preferably 280° C. or higher and particularly preferably 300° C. and higher. Within this range, a thermoformed article with good appearance, hue, mechanical strength and the like can be obtained without thermal decomposition of the polycarbonate resin upon production and molding of the thermoformed article.

<Coating Layer>

A coating layer of the laminated synthetic resin sheet of interest can be formed of a resin composition having an acrylic resin (B) as a main component.

Acrylic Resin (B)

An acrylic resin used for the laminated synthetic resin sheet of interest is not particularly limited as long as it is a resin with an acrylic group. For example, it may be a copolymer of methyl methacrylate with methyl acrylate or ethyl acrylate. Among them, a methyl methacrylic resin (also referred to as PMMA: poly(methyl(meth)acrylate) whose main component is polymerized with methacrylate is preferable.

Preferably, the copolymerization composition of the acrylic resin is appropriately selected according to the production conditions such as coextrusion conditions. For example, in a case of a copolymer of methyl methacrylate with methyl acrylate or ethyl acrylate, the molar ratio is preferably methyl methacrylate: methyl or ethyl acrylate=80:20-1:99.

In addition, it may contain a crosslinking component within a range that allows extrusion molding.

The molecular weight of the acrylic resin is generally, but not limited to, 30,000-300,000 in terms of a mass-average molecular weight.

A commercially available acrylic resin can also be used. For example, a methylmethacrylic resin such as SUM IPEX series from Sumitomo Chemical, ACRYPET series from Mitsubishi Rayon, PARAPET series from Kuraray or DELPET from Asahi Kasei may be used, although it is not limited thereto.

For the purpose of retaining weatherability for a long period of time, the acrylic resin (B) may contain an ultraviolent absorbent. The content of the ultraviolent absorbent is preferably 0.01-3.0% by mass with respect to the acrylic resin.

In addition, it may also contain an antioxidant, a coloring inhibitor and the like in order to prevent thermal degradation of the acrylic resin upon coextrusion molding. In this case, the content of the antioxidant is preferably 0.01-3% by mass with respect to the acrylic resin and the content of the coloring inhibitor is preferably 0.01-3% by mass.

In both cases, if the content is less than 0.01% by mass with respect to the acrylic resin, the effect is expected to be insufficient. On the other hand, if the content exceeds 5% by mass, not only further effect cannot be expected but also bleedout may occur that causes whitening or leads to deterioration of adhesion or impact strength, which are unfavorable.

Moreover, in order to further enhance the surface hardness, a high-Tg acryl or the like may be dispersed in the acrylic resin to maintain transparency. In addition, methyl methacrylate-styrene copolymer resin (MS resin) may be added to reduce the water-absorbing rate to suppress bubbles. A methyl methacrylate-styrene-maleic anhydride copolymer resin can be added to reduce the water-absorbing rate to reduce warpage of the molded article in a hot humid environment.

Additionally, metal particles, for example, of a nano-size may be dispersed in the acrylic resin as a scratch resistance auxiliary. By controlling the added amount, scratch resistance performance tested with steel wool, pig bristles or the like can be enhanced while suppressing generation of haze. Examples of the nano-sized metal particles include, but not limited to, silicon dioxide and alumina. The average particle diameter of the metal particles is preferably about 150-350 nm and particularly preferably about 200-350 nm. If the average particle diameter is 350 nm or more, interference of light occurs, by which haze is increased and transparency is lost. On the other hand, if the average particle diameter is 150 nm or less, the effect of enhancing the scratch resistance performance will be small. While the added amount depends on the intended scratch resistance performance, it is favorably 1.5 parts or less by mass with respect to 100 parts by mass of the acrylic resin (B) from the view point of transparency including haze. If 1.5 parts or more by mass is added, transparency is impaired and the design property characteristic of the laminated synthetic resin body of the present invention will be deteriorated, which are unfavorable.

<Hard Coat Layer>

In the laminated synthetic resin sheet of the present invention, a hard coat layer may be laminated on the surface on the acrylic resin layer side, that is, the surface of the acrylic resin (B) layer on the opposite side to the polycarbonate resin (A) layer.

As the hard coat layer, an acrylic, a silicon-based, a melamine-based, an urethane-based or an epoxy-based compound or the like that forms a known crosslinking coating film can be used. As the curing method, a known method such as ultraviolet curing, thermosetting or electronic beam curing can be used. Among them, a compound that is capable of making the surface to have a pencil hardness of H or more is preferable, where it is, for example, preferably an acrylic or an urethane acrylate-based compound due to the balance with the thermoformability.

The hard coat layer may be provided by a usual method and can be formed by, but not limited to, a painting method such as a roll coating method, a dip method or a transfer method.

As an acrylic compound for forming a hard coat layer, a crosslinked polymer compound having at least two (meth)acryloyloxy groups (i.e., an acryloyloxy group and/or a methacryloyloxy group, the same shall apply hereinafter) in the molecule can be used, where the residue binding the (meth)acryloyloxy groups is a hydrocarbon or a derivative thereof and the molecule includes an ether bond, a thioether bond, an ester bond, an amide bond, an urethane bond or the like. In addition, a long-chain component with a molecular weight of a thousand to several thousands may appropriately be contained as a component for imparting thermoformability.

0000 steel wool from Nippon Steel Wool with a diameter of about 0.012 mm is attached to a 33 mm×33 mm square pad. This pad is placed on a sample surface of the hard coat layer held on a table and moved to and fro for 15 times under a load of 1,000 g for scratching. The haze value measured after washing this sample with ethanol is preferably 10% or less.

For example, nano-sized metal particles may be added to the hard coat layer as a scratch resistance auxiliary.

Examples of the nano-sized metal particles include, but not limited to, silicon dioxide and alumina.

The hard coat layer of the present invention is characteristic in that it can elongate upon thermoforming and in that it is excellent in chemical resistance. Among the chemical resistance, it is particularly excellent in Neutrogena resistance.

The thickness of the hard coat layer is 1-20 μm, preferably 2-10 μm and more preferably 3-8 μm.

<Sheet Thickness>

The thickness of each layer of the laminated synthetic resin sheet of interest and the thickness of the entire sheet can appropriately be set to lie within a range that does not cause any problem to the surface hardness and the moldability. Generally, the thickness of the entire sheet is preferably 0.1 mm-2.0 mm while the thickness of the coating layer is 10 μm-60 μm, particularly preferably 40 μm-60 μm.

<Production Method>

Although a method for producing a laminated synthetic resin sheet of interest is not particularly limited, it is preferable to laminate the substrate layer and the coating layer by coextrusion from the view point of productivity.

In an exemplary production method, a polycarbonate resin (A) and an acrylic resin (B) are heated and melted in separate extruders and separately extruded from slit-shaped discharge ports of a T-die, and then brought into close contact with a cooling roll for solidification.

The temperature for heating and melting with the extruder is preferably higher than the glass-transition temperature (Tg) of each resin by 80-150° C. In general, the temperature condition of the main extruder for extruding the polycarbonate resin (A) is usually set to 230-290° C. and preferably 240-280° C., while the temperature condition of the sub-extruder for extruding the acrylic resin (B) is usually set to 220-270° C. and preferably 230-260° C.

Furthermore, as a method for coextruding the two types of molten resins, any known method such as a feedblock method or a multi-manifold method can be employed.

For example, in a case of a feedblock method, molten resins laminated by a feedblock is guided to a sheet molding die such as a T-die to be molded into a sheet shape, which is then flowed into a molding roll (polishing roll) with a mirror-finished surface to form a bank so that it is mirror finished and cooled while passing through the molding roll.

In a case of a multi-manifold method, molten resins laminated in a multi-manifold die is molded into a sheet in the die and then surface finished and cooled with a molding roll.

In either case, it is preferable that the temperature of the die is generally set to 230-290° C. and particularly set to 250-280° C. while the molding roll temperature is generally set to 100-190° C. and particularly set to 110-190° C.

Each of the materials constituting the polycarbonate resin (A) and the acrylic resin layer (B) according to the present invention is preferably filtrated/purified by filter treatment. Production or lamination through a filter gives a laminated synthetic resin body with less appearance defects such as contaminants and flaw. The filtration method is not particularly limited and melt filtration, solution filtration, a combination thereof or the like can be employed. In particular, filtration is most preferably performed at the timing of laminating into a sheet.

The filter used is not particularly limited and any known filter can suitably be selected according to the temperature upon use, viscosity, filtration accuracy and the like of the materials. The material of the filter is not particularly limited, and any of nonwoven fabric such as polypropylene, cotton, polyester, viscose rayon or glass fiber, a roving yarn roll, phenol resin-impregnated cellulose, a sintered compact of nonwoven metal fiber, a sintered compact of metal powder, a woven metal fiber body, a combination thereof or the like can be used. In particular, a sintered version of nonwoven metal fiber is preferable considering heat resistance, durability and pressure resistance.

The filtration accuracy for the resin composition used as the surface layer (A) and the polycarbonate-based resin used as the resin layer (B) is 50 μm or less, preferably 30 μm or less, and more preferably 10 μm or less. Alternatively, since the hard coat agent is applied on the uppermost surface layer of the laminated synthetic resin body, the filtration accuracy of the hard coat agent is 20 μm or less, preferably 10 μm or less and more preferably 5 μm or less.

In order to filtrate the resin composition used as the surface layer (A) and the polycarbonate-based resin used as the resin layer (B), for example, a polymer filter used for melt filtration of the thermoplastic resin is preferably used. While polymer filters can be classified into leaf disk filters, candle filters, pack disk filters, cylinder type filters or the like according to their configurations, leaf disk filters are favorable due to their large effective filtration area.

The hard coat treatment is carried out upon or after the extrusion step. While a hard coat that is excellent in wear resistance and fingerprint resistance (fingerprint wiping property) is usually preferable, a hard coat having desired thermoformability is preferably applied since it is requisite to provide a desired three-dimensional shape by thermoforming.

<Characteristics and Applications of Laminated Synthetic Resin Sheet>

Since the laminated synthetic resin sheet of interest is provided with a coating layer having an acrylic resin (B) as a main component, the present invention is characteristic in that the coating layer surface of the laminated synthetic resin sheet as well as the surface of the product obtained by molding said laminated synthetic resin sheet are less susceptible to damage. In addition, since an elongational viscosity of a polycarbonate resin (A) as the substrate layer shows a strain softening property at a strain rate of 0.01-5.0/sec and the absolute value of the difference in the glass-transition temperature from the acrylic resin (B) is set to lie within 30° C., whitening, crack and even bubble making can be prevented even when thermoforming, particularly deep-draw molding, is carried out such that the coating layer side becomes the outer surface of the product. Similarly good thermoforming can be carried out in a case of a sheet laminated with a HC layer.

Therefore, a thermoformed article with an excellent design property, particularly a thermoformed article obtained by deep-draw molding with an excellent design property, can be obtained by thermoforming using the laminated synthetic resin sheet of interest.

According to the present invention, deep draw means to have a deep-drawn height of 3 mm or higher, in particular 5 mm or higher, upon molding, while a radius of the right-angled shape part obtained by molding into a right-angled shape is referred to as R.

With the laminated synthetic resin sheet of interest, whitening, crack and even bubble making can be prevented and the radius R of the right-angled shape part can be made to stay within at least 3.0 mm (within 1.0 mm in a more preferable embodiment) even when deep draw is performed with a deep-drawn height of 5 mm or higher (7 mm or higher in a more preferable embodiment) and a right-angle shape is molded.

Moreover, since the laminated synthetic resin sheet of interest has the above-described characteristics, an in-mold molded article with an excellent design property can be produced, for example, by forming a print layer on the substrate layer side of the laminated synthetic resin sheet upon thermoforming and further injection molding a molten resin on said print layer side so as to form a backing layer.

PRODUCTION EXAMPLES

Hereinafter, production examples of a polycarbonate resin (A) used with the present invention will be described, although the present invention should not be limited to these production examples.
(Synthesis of Terminating Agent)

Synthetic Example 1

Based on the Handbook of Organic Chemicals, pp. 143-150, 4-hydroxybenzoic acid from Tokyo Chemical Industry and 1-hexadecanol from Tokyo Chemical Industry were used for esterification through dehydration reaction, thereby obtaining hexadecyl para-hydroxybenzoate (CEPB).

Synthetic Example 2

2-Hexyldecyl para-hydroxybenzoate (HDPB) was obtained in the same manner as Production example 1 except that 1-hexadecanol in Synthetic example 1 was changed to 2-hexyldecanol (trade name: NJCOL 160BR) from New Japan Chemical.

Production Example 1

To 57.2 kg of 9 w/w % aqueous sodium hydroxide solution, 7.1 kg (31.14 mol) of Bisphenol A (hereinafter, referred to as BPA) from Nippon Steel Chemical and 30 g of hydrosulfite were added and dissolved. To this, 40 kg of dichloromethane was added and 4.33 kg of phosgene was blown into the resultant for 30 minutes while stirring and maintaining the solution temperature to lie within a range of 15° C.-25° C.

After the phosgene blowing, a solution obtained by dissolving 6 kg of 9 w/w % aqueous sodium hydroxide solution, 11 kg of dichloromethane and 551 g (1.52 mol) of hexadecyl para-hydroxybenzoate (CEPB) as a terminating agent in 10 kg of methylene chloride was added and vigorously stirred for emulsification. Thereafter, 10 ml of triethylamine as a polymerization catalyst was added to the solution and allowed to polymerize for about 40 minutes.

The polymerization solution was separated into a water phase and an organic phase, and the organic phase was neutralized with phosphate. Washing with pure water was repeated until the pH of the washing liquid became neutral. The organic solvent was evaporated and distilled away from this purified polycarbonate resin solution to obtain polycarbonate resin powder.

The resulting polycarbonate resin powder was melt kneaded with a twin-screw extruder having a screw diameter of 35 mm at a cylinder temperature of 260° C. and extruded into a strand shape, which was pelletized with a pelletizer.

The resulting polycarbonate resin pellets were used to measure the viscosity-average molecular weight, the elongational viscosity, the glass-transition temperature and the Q value. As a result, the viscosity-average molecular weight was 23,600, the elongational viscosity showed a strain softening property, the glass-transition temperature was 119° C. and the Q value was $16.7 \times 10^{-2}$ cc/s.

Production Example 2

Polycarbonate resin pellets were obtained in the same manner as Production example 1 except that CEPB in Production example 1 was changed to 2-ethylhexyl para-hydroxybenzoate (EHPB) from Tokyo Chemical Industry and that the amount of EHPB was 376 g (1.50 mol).

The resulting polycarbonate resin pellets had a viscosity-average molecular weight of 22,700, an elongational viscosity that showed a strain softening property, a glass-transition temperature of 132° C. and a Q value of $11.2 \times 10^{-2}$ cc/s.

Production Example 3

Polycarbonate resin pellets were obtained in the same manner as Production example 1 except that CEPB in Production example 1 was changed to 2-hexyldecyl para-hydroxybenzoate (HDPB) and that the amount of HDPB was 383 g (1.06 mol).

The resulting polycarbonate resin pellets had a viscosity-average molecular weight of 24,600, an elongational viscosity that showed a strain softening property, a glass-transition temperature of 126° C., and a Q value of $11.6 \times 10^{-2}$ cc/s.

Production Example 4

Polycarbonate resin pellets were obtained in the same manner as Production example 1 except that the amount of CEPB in Production example 1 was changed to 443 g (1.22 mol).

The resulting polycarbonate resin pellets had a viscosity-average molecular weight of 27,600, an elongational viscosity that showed a strain softening property, a glass-transition temperature of 127° C. and a Q value of $7.7 \times 10^{-2}$ cc/s.

Production Example 5

Polycarbonate resin pellets were obtained in the same manner as Production example 1 except that CEPB in Production example 1 was changed to dodecyl para-hydroxybenzoate (PODB) from Tokyo Chemical Industry and that the amount of PODB was 443 g (1.45 mol).

The resulting polycarbonate resin pellets had a viscosity-average molecular weight of 20300, an elongational viscosity that showed a strain softening property, a glass-transition temperature of 128° C. and a Q value of $21.4 \times 10^{-2}$ cc/s.

EXAMPLES

Hereinafter, examples of the present invention will be described, although the present invention should not be limited to these examples.

Example 1

The polycarbonate resin (A) and the acrylic resin (B) were each melted by heating in separate extruders so that the two types of resins were melt extruded from slit-shaped discharge ports of a T-die at the same time and laminated into a structure with two different kinds of layers, i.e., a substrate layer and a coating layer.

The main extruder for extruding the polycarbonate resin (A) was set to have a barrel diameter of 75 mm, screw L/D=32 and a cylinder temperature of 270° C. The sub-extruder for extruding the acrylic resin (B) was set to have a barrel diameter of 40 mm, screw L/D=32 and a cylinder temperature of 250° C.

As the polycarbonate resin (A), the polycarbonate resin (A) of Production example 1 was used. As the acrylic resin (B), an acrylic resin (from Arkema, trade name: Altuglas V020, composition: polymethyl methacrylate, Tg: 105° C.) was used.

A feedblock was used for lamination to obtain a structure with two different kinds of layers. The temperature inside the die head was set to 250° C., and the resins laminated inside the die were guided to three horizontally arranged mirror-finished cast rolls. At this point, the first roll was set to have a temperature of 110° C., the second roll was set to have a temperature of 100° C. and the third roll was set to have a temperature of 110° C.

Furthermore, the rotation rates of the main extruder and the sub-extruder were set such that the discharge amount ratio was main/sub=440/60. Coextrusion was performed to give a thickness of 0.5 mm, thereby obtaining a laminated synthetic resin sheet (entire sheet thickness of 0.5 mm and coating layer thickness of 60 μm).

The evaluation results of the resulting laminated synthetic resin sheet are shown in Table 1.

Example 2

A laminated synthetic resin sheet (entire sheet thickness of 0.125 mm and coating layer thickness of 30 μm) was obtained by changing only the discharge amount ratio among the production conditions of Example 1. The discharge amount ratio was main/sub=95/30.

The evaluation results of the resulting laminated synthetic resin sheet are shown in Table 1.

Example 3

Onto the acrylic resin layer of the laminated synthetic resin sheet (entire sheet thickness of 0.5 mm and coating layer thickness of 60 μm) produced in Example 1, a hard coat (urethane acrylate-based resin from Chugoku Marine Paints, product name: 363C-224HG, hard coat elongation rate: 100%), that is, a practically acceptable hard coat that had a haze of 10% or less after scratching in a scratch resistance test (in which #0000 steel wool from Nippon Steel Wool attached onto a 33 mm×33 mm square pad was reciprocated on the surface of the hard coat layer for 15 times under a load of 1,000 g), was applied to a thickness of 7 μm by a roll coating method, thereby obtaining a laminated synthetic resin sheet.

The evaluation results of the resulting laminated synthetic resin sheet are shown in Table 1.

Example 4

A laminated synthetic resin sheet (entire sheet thickness of 0.125 mm and coating layer thickness of 30 μm) was obtained by applying a hard coat similar to that in Example 3 onto the acrylic resin layer of the laminated synthetic resin sheet produced in Example 2.

The evaluation results of the resulting laminated synthetic resin sheet are shown in Table 1.

Example 5

A laminated synthetic resin sheet (entire sheet thickness of 0.5 mm and coating layer thickness of 60 μm) was obtained under the same production conditions as Example 1 except that the type of the polycarbonate resin (A) was changed. The polycarbonate resin of Production example 2 was used as the polycarbonate resin (A).

The evaluation results of the resulting laminated synthetic resin sheet are shown in Table 1.

Example 6

A laminated synthetic resin sheet (entire sheet thickness of 0.125 mm and coating layer thickness of 30 μm) was obtained by changing only the discharge amount ratio among the production conditions of Example 5. The discharge amount ratio was main/sub=95/30.

The evaluation results of the resulting laminated synthetic resin sheet are shown in Table 1.

Example 7

A laminated synthetic resin sheet (entire sheet thickness of 0.5 mm and coating layer thickness of 60 μm) was obtained by applying a hard coat similar to that in Example 3 onto the acrylic resin layer of the laminated synthetic resin sheet produced in Example 5.

The evaluation results of the resulting laminated synthetic resin sheet are shown in Table 2.

Example 8

A laminated synthetic resin sheet (entire sheet thickness of 0.125 mm and coating layer thickness of 30 μm) was obtained by applying a hard coat similar to that in Example 3 onto the acrylic resin layer of the laminated synthetic resin sheet produced in Example 6.

The evaluation results of the resulting laminated synthetic resin sheet are shown in Table 2.

Example 9

A laminated synthetic resin sheet (entire sheet thickness of 0.5 mm and coating layer thickness of 60 μm) was obtained under the same production conditions as Example 1 except that the type of the polycarbonate resin (A) was changed. The polycarbonate resin of Production example 3 was used as the polycarbonate resin (A).

The evaluation results of the resulting laminated synthetic resin sheet are shown in Table 2.

Example 10

A laminated synthetic resin sheet (entire sheet thickness of 0.5 mm and coating layer thickness of 60 μm) was obtained under the same production conditions as Example 1 except that the type of the polycarbonate resin (A) was changed. The polycarbonate resin of Production example 4 was used as the polycarbonate resin (A).

The evaluation results of the resulting laminated synthetic resin sheet are shown in Table 2.

Example 11

A laminated synthetic resin sheet (entire sheet thickness of 0.5 mm and coating layer thickness of 60 μm) was obtained under the same production conditions as Example 1 except that the type of the polycarbonate resin (A) was changed. The polycarbonate resin of Production example 5 was used as the polycarbonate resin (A).

The evaluation results of the resulting laminated synthetic resin sheet are shown in Table 2.

Comparative Example 1

A single-layer sheet of the polycarbonate resin (A) (entire sheet thickness of 0.5 mm) was obtained without coextruding with the acrylic resin (B) under the same molding conditions as Example 1 except that the type of the polycarbonate resin (A) was changed.

The extruder for extruding the polycarbonate-based resin composition (A) was set to have a barrel diameter of 65 mm, screw L/D=35 and a cylinder temperature of 270° C.

An aromatic polycarbonate resin (from Mitsubishi Engineering-Plastics Corporation, trade name S-3,000, My 21,000, Tg 147° C.) (terminal structure was para-tert-butylphenol (PTBP) and the elongational viscosity did not show a strain softening property) was used as the polycarbonate resin (A).

The evaluation results of the resulting synthetic resin sheet are shown in Table 3.

Comparative Example 2

A laminated synthetic resin sheet (entire sheet thickness of 0.125 mm) was obtained by changing only the discharge amount ratio among the production conditions of Comparative example 1.

The evaluation results of the resulting synthetic resin sheet are shown in Table 3.

Comparative Example 3

A laminated synthetic resin sheet was obtained by applying a hard coat similar to that in Example 3 onto the synthetic resin sheet obtained in Comparative example 1.

The evaluation results of the resulting laminated synthetic resin sheet are shown in Table 3.

Comparative Example 4

A laminated synthetic resin sheet was obtained by applying a hard coat similar to that in Example 3 onto the synthetic resin sheet obtained in Comparative example 2.

The evaluation results of the resulting laminated synthetic resin sheet are shown in Table 3.

Comparative Example 5

A laminated synthetic resin sheet (entire sheet thickness of 0.5 mm and coating layer thickness of 60 μm) was obtained under the same production conditions as Example 1 except that the type of the polycarbonate resin (A) was changed.

An aromatic polycarbonate resin (from Mitsubishi Engineering-Plastics Corporation, trade name S-3,000, My 21,000, Tg 147° C.) (terminal structure was para-tert-butylphenol (PTBP) and the elongational viscosity did not show a strain softening property) was used as the polycarbonate resin (A).

The evaluation results of the resulting laminated synthetic resin sheet are shown in Table 3.

Comparative Example 6

A laminated synthetic resin sheet (entire sheet thickness of 0.125 mm and coating layer thickness of 30 μm) was obtained by changing only the discharge amount ratio among the production conditions of Comparative example 5. The discharge amount ratio was main/sub=95/30.

The evaluation results of the resulting laminated synthetic resin sheet are shown in Table 3.

Comparative Example 7

A laminated synthetic resin sheet was obtained by applying a hard coat similar to that in Example 3 onto the acrylic resin layer of the laminated synthetic resin sheet obtained in Comparative example 5.

The evaluation results of the resulting laminated synthetic resin sheet are shown in Table 4.

Comparative Example 8

A laminated synthetic resin sheet was obtained by applying a hard coat similar to that in Example 3 onto the acrylic resin layer of the laminated synthetic resin sheet obtained in Comparative example 6.

The evaluation results of the resulting laminated synthetic resin sheet are shown in Table 4.

Comparative Example 9

A laminated synthetic resin sheet (entire sheet thickness of 0.5 mm and coating layer thickness of 60 μm) was obtained under the same production conditions as Example 1 except that p-tert-butylphenol (PTBP) was used instead of CEPB in Production example 1 as the terminating agent, and that the type of the polycarbonate resin (A) was changed.

An aromatic polycarbonate resin (from Mitsubishi Engineering-Plastics Corporation, trade name E-2000, My 28,000, Tg 147° C.) and a polycyclohexane dimethylene terephthalate resin (a low crystalline copolymerization polyester having a structure where 65 mol % of ethylene glycol of PET was substituted with 1.4-CHDM; Tg 86° C.) were mixed at a mass ratio of 70:30, and the resultant was melt kneaded while heating to make a polymer alloy to obtain a polycarbonate-based resin composition, which was used as the polycarbonate resin (A). When the glass-transition temperature of this polycarbonate-based resin composition was measured, a single peak (Tg 121° C.) was seen in the differential values of the DSC curve, confirming that the composition was a polymer alloy. In addition, the elongational viscosity showed a strain softening property.

The evaluation results of the resulting laminated synthetic resin sheet are shown in Table 4.

Comparative Example 10

A laminated synthetic resin sheet (entire sheet thickness of 0.125 mm and coating layer thickness of 30 μm) was obtained by changing only the discharge amount ratio among the production conditions of Comparative example 9. The discharge amount ratio was main/sub=95/30.

The evaluation results of the resulting laminated synthetic resin sheet are shown in Table 4.

Comparative Example 11

A laminated synthetic resin sheet was obtained by applying a hard coat similar to that in Example 3 onto the acrylic resin layer of the laminated synthetic resin sheet obtained in Comparative example 9.

The evaluation results of the resulting laminated synthetic resin sheet are shown in Table 4.

Comparative Example 12

A laminated synthetic resin sheet was obtained by applying a hard coat similar to that in Example 3 onto the acrylic resin layer of the laminated synthetic resin sheet obtained in Comparative example 10.

The evaluation results of the resulting laminated synthetic resin sheet are shown in Table 4.

<Tests and Evaluations>

1) Pencil Hardness

The pencil hardness on the surfaces of the laminated synthetic resin sheets obtained in the examples and the comparative examples (surface on the coating layer side if a coating layer was formed) was measured in accordance with JIS K5400 at a load of 1 kg.

On the basis of "H" which is a level that practically causes no practical problem, harder "H" and "2H" were judged to be a success ("Good") while softer "B" was evaluated to be a failure ("Not good").

2) Sheet Appearance

For the laminated synthetic resin sheets obtained in the examples and the comparative examples, those that has good appearance without turbulence (flow pattern) at the interface between the polycarbonate resin (A) and the acrylic resin (B) were evaluated to be "Good" while those having turbulence at the interface was evaluated to be "Not good".

3) Molding Workability (Deep Drawability, Shaping Property of Right-Angled Shape)

The laminated synthetic resin sheets obtained in the examples and the comparative examples were each cut into 210 mm×297 mm with a thickness of 0.5 mm or 0.125 mm. The resulting sample sheets were preheated to (Tg of polycarbonate resin (A)+30° C.), and subjected to pressure forming using a right-angled shape mold at indicated temperature (see Tables 1 and 2) with high pressure air of 5 MPa and a deep-drawn height shown in Tables 1 and 2. The right-angled shape molds used had deep-drawn heights in increments of 1 mm, i.e., 1 mm, 2 mm . . . 5 mm.

The surface conditions of the resulting molded bodies (crack, whitening, bubble making, unevenness) were observed, and evaluated to have "No appearance abnormality" when no crack, whitening, bubble making or unevenness was observed. Furthermore, those that resulted a molded article having a deep-drawn height of 5 mm or more and a radius R of the right-angled shape part of 3.0 mm or less with no appearance abnormality was evaluated to be an overall success ("Good"). Here, the radius R of the right-angled shape part was actually measured with a contact type contour detector CONTOURECORD 2700/503 (from Tokyo Seimitsu).

TABLE 1

|  |  | Example 1 | Example 2 | Example 3 | Example 4 | Example 5 | Example 6 |
| --- | --- | --- | --- | --- | --- | --- | --- |
| Coating layer | Tg (° C.) of acrylic resin (B) | 105 | 105 | 105 | 105 | 105 | 105 |
|  | Thickness (μm) | 60 | 30 | 30 | 30 | 60 | 30 |
| Substrate layer | Elongational viscosity (Strain softening property) | Good | Good | Good | Good | Good | Good |
|  | Terminating agent for polycarbonate resin | CEPB | CEPB | CEPB | CEPB | EHPB | EHPB |
|  | Tg (° C.) of polycarbonate resin (A) | 119 | 119 | 119 | 119 | 132 | 132 |
|  | Difference in Tg from acrylic resin: Tg (A) − Tg (B) (° C.) | 14 | 14 | 14 | 14 | 27 | 27 |
|  | Thickness (μm) | 440 | 95 | 440 | 95 | 440 | 95 |
| HC layer | Thickness (μm) |  |  | 7 | 7 |  |  |
| Evaluation | Pencil hardness of sheet | 2H | 2H | 2H | 2H | 2H | 2H |
|  |  | Good | Good | Good | Good | Good | Good |
|  | Appearance of sheet | Good | Good | Good | Good | Good | Good |
| Moldability (Deep drawability) | Deep drawn height | 9 mm | 10 mm | 7 mm | 8 mm | 7 mm | 8 mm |
|  | Molding temperature | 149 | 149 | 149 | 149 | 162 | 162 |
|  | Radius R of right angled shape part | 1.0 mm | 1.3 mm | 1.0 mm | 1.3 mm | 1.7 mm | 2.0 mm |
|  | Appearance Observation | No appearance abnormality | No appearance abnormality | No appearance abnormality | No appearance abnormality | No appearance abnormality | No appearance abnormality |
|  | Evaluation | Good | Good | Good | Good | Good | Good |
|  | Overall | Good | Good | Good | Good | Good | Good |

TABLE 2

|  |  | Example 7 | Example 8 | Example 9 | Example 10 | Example 11 |
| --- | --- | --- | --- | --- | --- | --- |
| Coating layer | Tg (° C.) of acrylic resin (B) | 105 | 105 | 105 | 105 | 105 |
|  | Thickness (μm) | 60 | 30 | 60 | 60 | 60 |
| Substrate layer | Elongational viscosity (Strain softening property) | Good | Good | Good | Good | Good |
|  | Terminating agent for polycarbonate resin | EHPB | EHPB | HDPB | CEPB | PODB |
|  | Tg (° C.) of polycarbonate resin (A) | 132 | 132 | 126 | 127 | 128 |
|  | Difference in Tg from acrylic resin: Tg (A) − Tg (B) (° C.) | 27 | 27 | 21 | 22 | 23 |
|  | Thickness (μm) | 440 | 95 | 440 | 440 | 440 |

TABLE 2-continued

|  |  | Example 7 | Example 8 | Example 9 | Example 10 | Example 11 |
|---|---|---|---|---|---|---|
| HC layer | Thickness (μm) | 7 | 7 | — | — | — |
| Evaluation | Pencil hardness of sheet | 2H | 2H | 2H | 2H | 2H |
|  |  | Good | Good | Good | Good | Good |
|  | Appearance of sheet | Good | Good | Good | Good | Good |
| Moldability (Deep drawability) | Deep-drawn height | 6 mm | 7 mm | 8 mm | 8 mm | 8 mm |
|  | Molding temperature | 162 | 162 | 156 | 157 | 158 |
|  | Radius R of right-angled shape part | 1.7 mm | 2.0 mm | 1.5 mm | 1.5 mm | 1.7 mm |
|  | Appearance Observation | No appearance abnormality | No appearance abnormality | No appearance abnormality | No appearance abnormality | No appearance abnormality |
|  | Evaluation | Good | Good | Good | Good | Good |
|  | Overall | Good | Good | Good | Good | Good |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Coating layer | Tg (° C.) of acrylic resin (B) | — | — | — | — | 105 | 105 |
|  | Thickness (μm) | — | — | — | — | 60 | 30 |
| Substrate layer | Elongational viscosity (Strain softening property) | Not good | Not good | Not good | Not good | Not good | Not good |
|  | Terminating agent for polycarbonate resin | PTBP | PTBP | PTBP | PTBP | PTBP | PTBP |
|  | Tg (° C.) of polycarbonate resin (A) | 148 | 148 | 148 | 148 | 148 | 148 |
|  | Difference in Tg from acrylic resin: Tg (A) − Tg (B) (° C.) | — | — | — | — | 43 | 43 |
|  | Thickness (μm) | 500 | 125 | 500 | 125 | 440 | 95 |
| HC layer | Thickness (μm) | — | — | 7 | 7 | — | — |
| Evaluation | Pencil hardness of sheet | 2B | 2B | B | B | 2H | 2H |
|  |  | Not good | Not good | Not good | Not good | Good | Good |
|  | Appearance of sheet | Good | Good | Good | Good | Good | Good |
| Moldability (Deep drawability) | Deep-drawn height | 9 mm | 8 mm | 7 mm | 7 mm | 7 mm | 8 mm |
|  | Molding temperature | 178 | 178 | 178 | 178 | 178 | 178 |
|  | Radius R of right-angled shape part | 3.2 mm | 3.5 mm | 3.2 mm | 3.5 mm | 2.8 mm | 3.2 mm |
|  | Appearance Observation | No appearance abnormality | No appearance abnormality | No appearance abnormality | No appearance abnormality | Acrylic bubbles | Acrylic bubbles |
|  | Evaluation | Good | Good | Good | Good | Not good | Not good |
|  | Overall | Not good | Not good | Not good | Not good | Not good | Not good |

TABLE 4

|  |  | Comparative Example 7 | Comparative Example 8 | Comparative Example 9 | Comparative Example 10 | Comparative Example 11 | Comparative Example 12 |
|---|---|---|---|---|---|---|---|
| Coating layer | Tg (° C.) of acrylic resin (B) | 105 | 105 | 105 | 105 | 105 | 105 |
|  | Thickness (μm) | 60 | 30 | 60 | 30 | 60 | 30 |
| Substrate layer | Elongational viscosity (Strain softening property) | Not good | Not good | Good | Good | Good | Good |
|  | Terminating agent for polycarbonate resin | PTBP | PTBP | PTBP | PTBP | PTBP | PTBP |
|  | Tg (° C.) of polycarbonate resin (A) | 148 | 148 | 121 | 121 | 121 | 121 |
|  | Difference in Tg from acrylic resin: Tg (A) − Tg (B) (° C.) | 43 | 43 | 16 | 16 | 16 | 16 |
|  | Thickness (μm) | 440 | 95 | 440 | 95 | 440 | 95 |
| HC layer | Thickness (μm) | 7 | 7 | — | — | 7 | 7 |
| Evaluation | Pencil hardness of sheet | 2H | 2H | 2H | 2H | 2H | 2H |
|  |  | Good | Good | Good | Good | Good | Good |
|  | Appearance of sheet | Good | Good | Not good | Not good | Not good | Not good |
| Moldability (Deep drawability) | Deep-drawn height | 4 mm | 5 mm | 9 mm | 10 mm | 7 mm | 8 mm |
|  | Molding temperature | 178 | 178 | 151 | 151 | 151 | 151 |
|  | Radius R of right-angled shape part | 3.0 mn | 3.3 mn | 1.0 mn | 1.3 mn | 1.0 mn | 1.3 mn |

TABLE 4-continued

|  | Comparative Example 7 | Comparative Example 8 | Comparative Example 9 | Comparative Example 10 | Comparative Example 11 | Comparative Example 12 |
|---|---|---|---|---|---|---|
| Appearance Observation | Crack | Crack | No appearance abnormality | No appearance abnormality | No appearance abnormality | No appearance abnormality |
| Evaluation | Not good | Not good | Good | Good | Good | Good |
| Overall | Not good | Not good | Not good | Not good | Not good | Not good |

(Discussion)

From the above results, it was confirmed that the hardness of the laminated synthetic resin sheet surface (coating layer surface) can sufficiently be enhanced by forming a coating layer having the acrylic resin (B) as the main component. Therefore, not only the laminated synthetic resin sheet but also the surface of a product molded from said laminated synthetic resin sheet can be made to be less susceptible to damage.

Furthermore, it was found that a molded product with no appearance defect such as crack, whitening, bubble making and unevenness can be obtained even when deep draw is performed with a deep-drawn height of 7 mm or higher and even when a right-angle shape is molded, because the elongational viscosity of the polycarbonate resin (A) serving as the substrate layer shows a strain softening property. More specifically, since CEPB (Examples 1-4) having a terminal alkyl group ($R_1$ of Formula (1) above) with a carbon number of 8, EHPB (Examples 5-8), HDPB (Example 9) or CEPB (Example 10) having a terminal alkyl group with a carbon number of 16, or PODB (Example 11) having a terminal alkyl group with a carbon number of 12 was used as the terminating agent for the polycarbonate resin (A) to impart a strain softening property to the elongational viscosity of the polycarbonate resin (A), a laminated synthetic resin sheet with excellent moldability was realized while maintaining good appearance. Moreover, owing to the layer formed of the acrylic resin (B), the hardness of the surface was also satisfactory.

On the other hand, the laminated synthetic resin sheets without the acrylic resin (B) layer according to Comparative examples 1-4 had insufficient surface hardness, and the strain softening property and the molding workability were poor since the terminating agent used had a terminal alkyl group with a less carbon number. In addition, in Comparative examples 5-8 that employed the acrylic resin (B) layer but used a polycarbonate resin (A) having a terminal alkyl group with a less carbon number, bubble making and crack were observed, which resulted in poor moldability. In Comparative examples 9-12 that had a strain softening property but employed a polymer alloy containing other resin as a polycarbonate-based resin, the sheet appearance was poor.

Accordingly, the laminated synthetic resin sheet of the present invention can be used not only to obtain a molded product with a surface less susceptible to damage and excellent in moldability but also to produce an in-mold molded product without causing fading of the printing ink. An in-mold molded product may be obtained, for example, by providing a print layer with printing ink on the substrate layer upon thermoforming and further injection molding a molten resin on said print layer side so as to form a backing layer.

The invention claimed is:

1. A laminated synthetic resin sheet comprising a coating layer containing an acrylic resin (B) on at least one surface of a substrate layer containing a polycarbonate resin (A) with a viscosity-average molecular weight of 18,000-35,000 that is produced by reacting a dihydric phenol and a carbonate binder using a monohydric phenol represented by formula (1) below as a terminating agent:

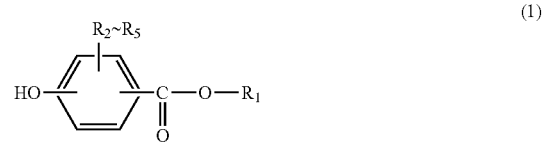

(1)

wherein, $R_1$ represents an alkyl group with a carbon number of 8-36, or an alkenyl group with a carbon number of 8-36, $R_2$-$R_5$ each represent hydrogen, halogen or an optionally substituted or unsubstituted alkyl group with a carbon number of 1-20 or aryl group with a carbon number of 6-12, and the substituent is halogen, an alkyl group with a carbon number of 1-20 or an aryl group with a carbon number of 6-12.

2. The laminated synthetic resin sheet according to claim 1, wherein the dihydric phenol is expressed by formula (3) below:

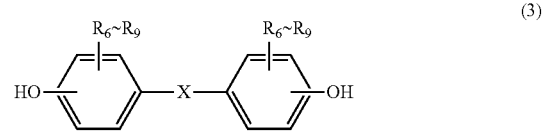

(3)

wherein, $R_6$-$R_9$ each independently represents hydrogen, halogen, an substituted or unsubstituted alkyl group with a carbon number of 1-20, an substituted or unsubstituted alkoxy group with a carbon number of 1-5, an substituted or unsubstituted aryl group with a carbon number of 6-12, an substituted or unsubstituted aralkyl group with a carbon number of 7-17, or an substituted or unsubstituted alkenyl group with a carbon number of 2-15, the substituent is halogen, an alkyl group with a carbon number of 1-20 or an aryl group with a carbon number of 6-12, and X represents —O—, —S—, —SO—, —$SO_2$—, —CO— or any of the binding groups represented by Formulae (4) to (7) below)

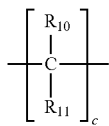
(4)

wherein, $R_{10}$ and $R_{11}$ each represent hydrogen, halogen, an substituted or unsubstituted alkyl group with a carbon number of 1-20, an substituted or unsubstituted alkoxy group with a carbon number of 1-5, an substituted or unsubstituted aryl group with a carbon number of 6-12, an substituted or unsubstituted alkenyl group with a carbon number of 2-5, or an substituted or unsubstituted aralkyl group with a carbon number of 7-17, $R_{10}$ and $R_{11}$ may bind to each other to form a carbocyclic ring or a heterocyclic ring with a carbon number of 1-20, and c represents an integer of 0-20.

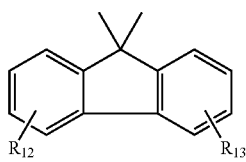
(5)

wherein, $R_{12}$ and $R_{13}$ each represent hydrogen, halogen, an substituted or unsubstituted alkyl group with a carbon number of 1-20, an substituted or unsubstituted alkoxy group with a carbon number of 1-5, an substituted or unsubstituted aryl group with a carbon number of 6-12, an substituted or unsubstituted alkenyl group with a carbon number of 2-5, or an substituted or unsubstituted aralkyl group with a carbon number of 7-17, and $R_{12}$ and $R_{13}$ may bind to each other to form a carbocyclic ring or a heterocyclic ring with a carbon number of 1-24.

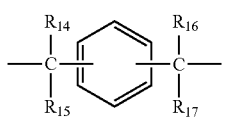
(6)

wherein, $R_{14}$-$R_{17}$ each represent hydrogen, halogen, an substituted or unsubstituted alkyl group with a carbon number of 1-20, an substituted or unsubstituted alkoxy group with a carbon number of 1-5, an substituted or unsubstituted aryl group with a carbon number of 6-12, an substituted or unsubstituted alkenyl group with a carbon number of 2-5, or an substituted or unsubstituted aralkyl group with a carbon number of 7-17, and $R_{14}$ and $R_{15}$, and $R_{16}$ and $R_{17}$ may respectively bind to each other to form a carbocyclic ring or a heterocyclic ring with a carbon number of 1-20, the substituent in Formulae (3) to (6) above is halogen, an alkyl group with a carbon number of 1-20 or an aryl group with a carbon number of 6-12, and

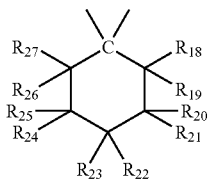
(7)

wherein, $R_{18}$-$R_{27}$ each represent a hydrogen atom or an alkyl group with a carbon number of 1-3.

3. A laminated synthetic resin sheet according to claim 1, wherein the monohydric phenol represented by Formula (1) above is at least one selected from the group consisting of 2-hexyldecyl para-hydroxybenzoate, hexadecyl para-hydroxybenzoate, dodecyl para-hydroxybenzoate and 2-ethylhexyl para-hydroxybenzoate.

4. The laminated synthetic resin sheet according to claim 1, wherein an elongational viscosity of the polycarbonate resin (A) shows a strain softening property at a strain rate of 0.01-5.0/sec.

5. The laminated synthetic resin sheet according to claim 1, wherein an absolute value of the difference in the glass-transition temperature between the polycarbonate resin (A) and the acrylic resin (B) is within 30° C.

6. The laminated synthetic resin sheet according to claim 1, wherein a hard coat layer is laminated on a surface of the acrylic resin (B) layer opposite to the polycarbonate resin (A) layer.

7. The laminated synthetic resin sheet according to claim 6, wherein the thickness of the hard coat layer is 1-20 μm.

8. A thermoformed article produced by thermoforming the laminated synthetic resin sheet according to claim 1 to have a deep-drawn height of 5 mm or more.

9. The thermoformed article according to claim 8, wherein the radius R of a part thermoformed into a right-angled shape is within 3.0 mm.

10. An in-mold molded article produced by forming a print layer on the substrate layer side of the laminated synthetic resin sheet according to claim 1 upon thermoforming, and further injection molding a molten resin on the print layer side to form a backing layer.

11. A laminated synthetic resin sheet comprising a coating layer containing an acrylic resin (B) laminated on at least one surface of a substrate layer containing a polycarbonate resin (A) with a viscosity-average molecular weight of 18,000-35,000 and having a terminal group represented by formula (1-a) below resulting from a monohydric phenol terminating agent:

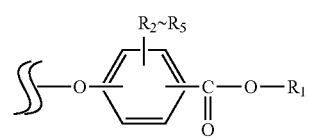
(1-a)

wherein, $R_1$ represents an alkyl group with a carbon number of 8-36 or an alkenyl group with a carbon number of 8-36, $R_2$-$R_5$ each represent hydrogen, halogen or a substituted or unsubstituted alkyl group with a carbon number of 1-20 or an aryl group with a carbon number of 6-12, and the substituent is halogen, an alkyl group with a carbon number of 1-20 or an aryl group with a carbon number of 6-12.

* * * * *